(12) United States Patent
Bell et al.

(10) Patent No.: US 6,248,257 B1
(45) Date of Patent: Jun. 19, 2001

(54) PORTABLE HEAT SOURCE

(75) Inventors: William L. Bell, Boulder; Robert J. Copeland, Arvada; Jianhan Yu, Boulder; James L. Dippo, Arvada, all of CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 09/351,821

(22) Filed: Jul. 12, 1999

Related U.S. Application Data

(63) Continuation-in-part of application No. 08/695,218, filed on Aug. 2, 1996, now Pat. No. 5,935,486.

(51) Int. Cl.[7] .............................. C09K 5/00; C09K 5/06; F24J 1/00

(52) U.S. Cl. ................ 252/70; 126/263.01; 126/263.05; 165/10

(58) Field of Search ..................... 252/70; 126/263.01, 126/263.05; 165/10

(56) References Cited

U.S. PATENT DOCUMENTS

| | | | |
|---|---|---|---|
| 3,079,911 | 3/1963 | Ryan et al. | 126/263.07 |
| 3,101,707 | 8/1963 | Ryan et al. | 126/263.05 |
| 3,288,217 | 11/1966 | Ralston | 166/279 |
| 3,378,333 | 4/1968 | Brite | 21/10 |
| 3,429,672 | 2/1969 | Young | 44/3 |
| 3,512,516 | 5/1970 | Glass et al. | 126/263.07 |
| 3,535,246 | 10/1970 | Crowell | 252/70 |
| 3,550,578 | 12/1970 | Fearon et al. | 126/263 |
| 3,585,982 | 6/1971 | Hollinshead | 126/263 |
| 3,683,889 | 8/1972 | Hoffman | 126/263 |
| 3,766,079 * | 10/1973 | Jackman et al. | 252/188.3 |
| 3,804,077 | 4/1974 | Williams | 126/263 |
| 3,903,011 | 9/1975 | Donnelly | 252/188.3 |
| 4,057,047 | 11/1977 | Gossett | 126/263 |
| 4,067,313 | 1/1978 | Donnelly | 126/263 |
| 4,287,076 | 9/1981 | Babin et al. | 252/70 |
| 4,501,259 | 2/1985 | Apellaniz | 126/263 |
| 4,510,919 | 4/1985 | Benmussa | 126/263 |
| 4,522,190 | 6/1985 | Kuhn et al. | 126/263 |
| 4,559,921 | 12/1985 | Benmussa | 126/263 |
| 4,736,599 | 4/1988 | Slegel | 62/294 |
| 4,741,324 | 5/1988 | Ina et al. | 126/263 |
| 4,751,119 | 6/1988 | Yukawa | 428/35 |
| 4,753,085 * | 6/1988 | Labrousse | 62/294 |
| 4,771,761 | 9/1988 | Doukhan | 126/263 |
| 4,773,389 | 9/1988 | Hamasaki | 126/263 |
| 4,780,117 | 10/1988 | Lahey et al. | 62/4 |
| 4,793,323 | 12/1988 | Guida et al. | 126/263 |
| 4,809,673 | 3/1989 | Charvin | 126/263 |
| 4,819,612 * | 4/1989 | Okamoto et al. | 126/263.01 |
| 4,888,188 | 12/1989 | Castner, Sr. et al. | 426/109 |
| 4,895,135 | 1/1990 | Hamasaki | 126/263 |
| 4,949,702 | 8/1990 | Suzuki | 126/263 |
| 5,035,230 | 7/1991 | Steidl et al. | 126/263.08 |
| 5,117,809 | 6/1992 | Scaringe | 126/263 |

(List continued on next page.)

FOREIGN PATENT DOCUMENTS

| | | |
|---|---|---|
| 0 017 468 | 4/1980 | (EP) . |
| 0017468 | 10/1980 | (EP) . |
| 0 564 680 A1 | 4/1992 | (EP) . |
| 2089970A | 6/1982 | (GB) . |
| 56-76482 | 6/1981 | (JP) . |
| 56-135585 * | 10/1981 | (JP) . |
| 1265964 | 10/1989 | (JP) . |
| 4-73020 | 3/1992 | (JP) . |
| WO 87/00409 | 1/1987 | (WO) . |
| WO 91/10102 | 7/1991 | (WO) ............................. 126/263.07 |
| WO 94/05136 | 3/1994 | (WO) . |
| 98/05906 | 2/1998 | (WO) . |

OTHER PUBLICATIONS

Lane, G.A. (ed.) (1983) Solar Heat Storage: Laten Heat Materials. vol. I: Background and Scientific Principles, CRC Press, Inc., Boca Raton, FL, pp. 18–25, 30–39, 42–49, 54–55 (no month).

Sacharow, S. (Sep. 1988) Prepared Foods, pp. 98 and 101.

DST–1810P–487–86–vol. 9–No. 1 (Mar. 18, 1986), pp. 43–44.

Military Specification MIL–R–44398A (Jul. 1990), pp. 47–61.

Chem Abstract 116:258459, "Effect of surfactants on the crystallization of Calcium Phosphate in the Calcium Oxide–Phosphorous Pentoxide–Water System," Kir'yanoya et al., 1991 (no month).

*Primary Examiner*—Anthony Green
(74) *Attorney, Agent, or Firm*—Greenlee, Winner and Sullivan, P.C.

(57) ABSTRACT

A portable heat source that may be used to warm food, beverage or other supplies. The heater contains a heat-producing composition that is a solid that may be stored for long periods of time, and activated by addition of water or an aqueous solution. Heat-producing compositions contain an acidic anhydride, an acidic salt, a basic anhydride or a basic salt. Preferred heat-producing compositions contain a mixture of an acidic anhydride or salt together with a basic anhydride or salt, such that addition of water to both acidic and basic anhydrides produces heat as well as acid and base respectively; subsequent reaction of the acid and base produces additional heat, as well as a safe, neutral product that is easily disposed. The invention further consists of means and methods for regulating the rate of heat production in heaters by the addition of inert additives to heat-producing compositions and the application of processing methods that regulate access of water to heat-producing compounds. Addition of inert materials and shaping, agglomerating, pelleting and like processing of heat-producing materials are applied to produced heat at a rate compatible with the rate at which the food or other materials can absorb the heat. The invention further consists of devices incorporating the materials to be heated in an advantageous arrangement with the heater composition.

54 Claims, 13 Drawing Sheets

U.S. PATENT DOCUMENTS

| | | | |
|---|---|---|---|
| 5,248,486 | 9/1993 | Matsuoka et al. | 252/70 |
| 5,255,812 | 10/1993 | Hsu | 220/277 |
| 5,266,772 | 11/1993 | Reed et al. | 219/137 R |
| 5,355,869 | 10/1994 | Pickard | 126/263 |
| 5,388,565 | 2/1995 | Ou | 126/263 DC |
| 5,465,707 | 11/1995 | Fulcher et al. | 126/263.08 |
| 5,477,847 | 12/1995 | Ueki | 126/263.07 |
| 5,483,949 | 1/1996 | James | 126/263.05 |
| 5,494,598 | 2/1996 | Hughes | 252/70 |
| 5,542,418 * | 8/1996 | James | 126/263.06 |
| 5,611,329 | 3/1997 | Lamensdorf | 126/263.07 |
| 5,626,022 | 5/1997 | Scudder et al. | 62/4 |
| 5,628,304 | 5/1997 | Freiman | 126/263.09 |
| 5,699,902 | 12/1997 | Sperry et al. | 206/219 |
| 5,738,082 | 4/1998 | Page et al. | 126/263.01 |
| 5,873,221 | 2/1999 | Sperry et al. | 53/472 |
| 5,935,486 * | 10/1999 | Bell et al. | 252/70 |

* cited by examiner

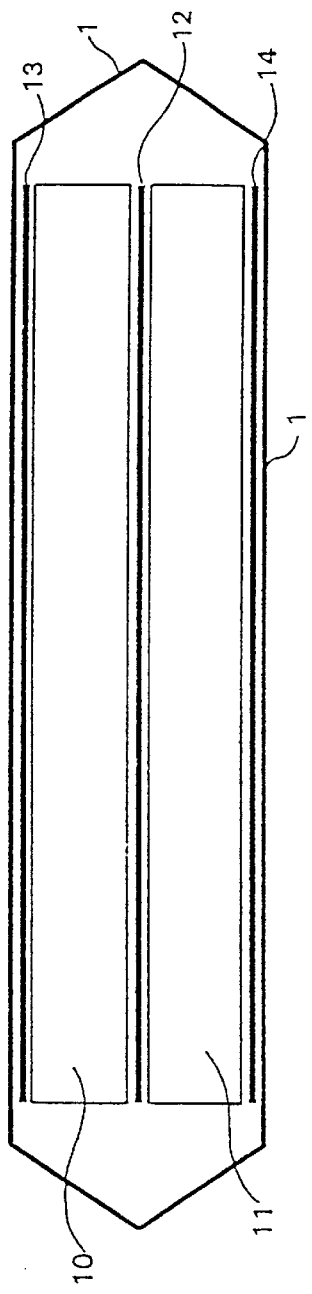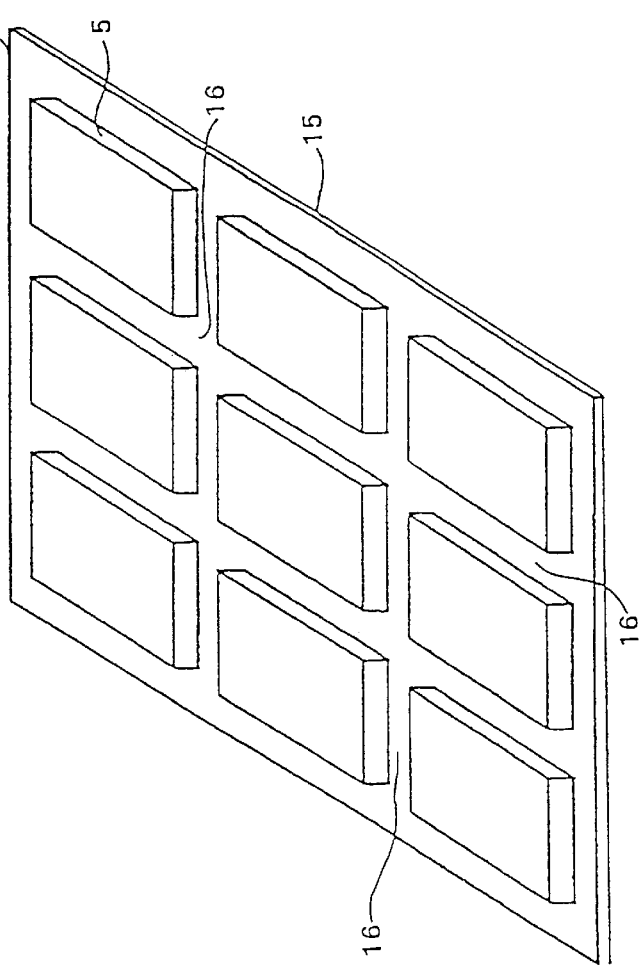
FIGURE 3A
FIGURE 3B

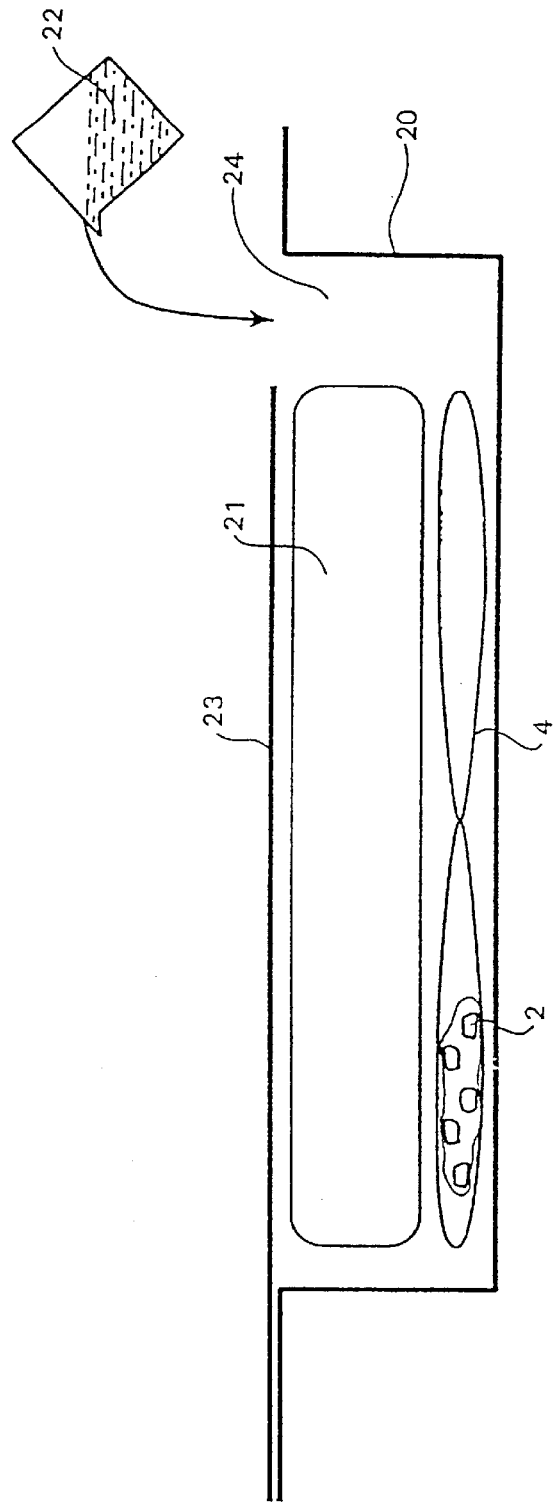
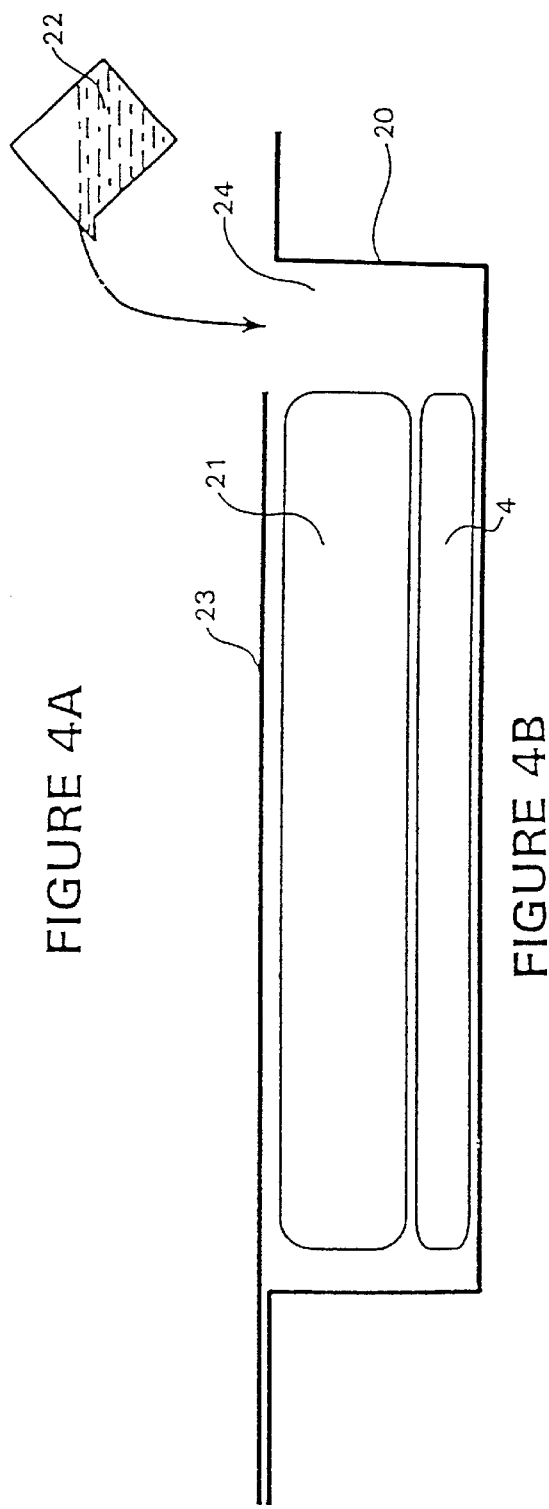

PORTABLE HEAT SOURCE

CROSS-REFERENCE TO RELATED APPLICATIONS

This application is a continuation-in-part of U.S. patent application Ser. No. 08/695,218, filed Aug. 2, 1996, now U.S. Pat. No. 5,935,486 which is incorporated in its entirety herein.

This invention was made with Governmnent support under contract DAAK60-92-C-0030 awarded by the U.S. Army. The Government has certain rights in the invention.

FIELD OF THE INVENTION

This invention relates to a heat source that may be used as a portable heating device to heat food, beverages or other supplies. The heat source employs in a portable heating device a heat-producing composition that can be stored for long periods of time and is activated by addition of an aqueous solution, for instance, water.

BACKGROUND OF INVENTION

The objective of this invention is a heat source that provides heat without the need for a stove, fire, external fuel source, or electrical or other power source. The heat source should be safe to store, transport, and operate; be convenient to use; have minimal weight and volume yet generate sufficient heat for various applications; and be readily and safely disposable after use. A number of portable heat sources, particularly for applications to the heating of food, are known. The materials and methods previously used in such portable heater sources suffer from a number of disadvantages, including the formation of flammable and/or toxic by-products that are potentially dangerous or that may require special disposal as hazardous materials. Many of the previously known portable heat sources also have low efficiency of heat production, i.e., low heat generated for a given weight or volume of heater material.

This invention relates to a heat source, useful in portable heating devices, in which the energy for generation of heat is stored in the form of materials that can be made to react producing heat. More specifically, heat is generated by addition of water to a heat-producing composition. The heat-producing composition of this invention and heaters made therefrom utilize a unique combination of chemical reactants to provide a heat source with the desired properties, but which avoids the disadvantages of prior art heat sources. The present invention provides a great improvement in safety and efficiency of heat production over the prior art.

U.S. Pat. No. 3,079,911 discloses a heating device which generates heat by the oxidation of a metal, and which is activated by addition of a liquid, preferably water. The exothermic composition disclosed is a mixture of aluminum, copper sulfate, potassium chlorate, and calcium sulfate. However, reaction of this mixture leads to the production of gases, which may be flammable or corrosive.

U.S. Pat. No. 4,809,673 discloses the use of the hydration of calcium oxide (quicklime, CaO) to generate heat. The heat output per weight (of the dry material) is approximately 501 Btu/lb. The disadvantages of this type of heater are the relatively low heat output and the requirement for use of a large heater because the powder density of calcium oxide is low.

U.S. Pat. No. 4,753,085 discloses several reactions for use in chemical heaters. For example, the reaction of sodium hydroxide with hydrochloric acid is disclosed, and this reaction produces more heat per weight of heater material (565 Btu/lb) than the hydration of calcium oxide discussed above. However, this heater involves the handling of a strong acid, HCl, which is dangerous. Another reaction disclosed is oxidation of iron powder to produce heat. This reaction is hindered by water. Portable heaters that function well in the presence of water are more desirable because water serves both to transfer heat from the heater to the food or other object to be heated, particularly by evaporation/condensation, and to limit the temperature of the heater by removing the heat of vaporization once the boiling point of water is reached.

U.S. Pat. No. 4,559,921 discloses a self-heating container including a vessel for food. Below the vessel is a sealed container holding calcium oxide and water. The calcium oxide and water are kept separate by a sealed pouch. A tearing element affixed to the pouch opens the pouch and the container, allowing water to contact the calcium oxide thereby starting the exothermic reaction to heat the food.

U.S. Pat. No. 4,949,702 discloses a self-heating device including a heater within a container. The heater includes two parts: a pyrogen of high energy density having a large heating value; and a firing agent which contacts the pyrogen. Both the pyrogen and the firing agent are a mixture of one or more kinds of metal oxides and one or more elementary substances or alloys of metal and semi-metal. The firing agent is activated by a spark from an igniter, something like a match.

U.S. Pat. No. 4,895,135 discloses a self-heating container which generates heat by an exothermic hydration reaction. The container includes an outer shell, an envelope to hold the exothermic reactant, a water bag containing water, and a container body for food. The container body is made from a sheet member, such as metal foil, and a synthetic resin layer attached on at least one side of the metal foil. The sheet member is folded so that its cross-section is W-shaped and it is heat-sealed along the vertical and upper edges. An inverted V-shaped part of the sheet member makes a compartment for holding the envelope inside. The patent refers to the use of hydration of calcium oxide to generate heat.

U.S. Pat. No. 5,355,869 discloses a self-heating assembly for heating group-sized meals, for example meals for a military group. The assembly includes a number of heating trays and a corresponding number of heater assemblies. Each heater assembly is made of a sturdy polymeric sheet of material to form a number of pockets, and a sheet of porous non-woven scrim is attached to the bottom of the polymeric sheet to seal the pockets. A Mg—Fe alloy is the exothermic chemical used in the heater. Water is not included in the assembly but is added when the assembly is ready to be used.

U.S. Pat. No. 5,205,277 (and corresponding European Patent No. 0564680A1) disclose a self-heating container which employs three heating packs. The first heating pack contains calcium oxide and is the main component for producing heat. The second (medium) temperature heating pack contains an exothermic liquid composed of NaCl, acetic acid, and water. The third (high) heating pack contains an exothermic liquid composed of the same components as the medium heating pack, except in different ratios. The liquids in the medium and high heating packs are used to react with the calcium oxide, thereby releasing the heat of hydration to heat food.

U.S. Pat. No. 4,751,119 discloses a container for self-heating or self-cooling drinks or food which includes a device for delivering a liquid reactant to a solid reactant, yielding either an exothermic or an endothermic reaction. The exothermic reactants disclosed are the following: "quicklime, sodium hydroxide, cobalt, chromium, iron, iron hydroxide, magnesium, manganese, molybdenum, tin oxide (II), titanium, sodium, calcium hydroxide, sulfuric acid, nitric acid, metallic sodium, etc. Among them, a powder of magnesium chloride is preferable. The reactants are those generating an oxide reacting with oxygen at room temperature in the form of a revived metal or a metallic [sic] compound and having an exothermic characteristic. It is preferable to mix two or more metal powders." The preferred method of this patent, reaction of magnesium chloride with water, avoids the use of either a strong acid or base. This reaction has a heat output per weight of reactant of only 721 Btu/lb. The complete hydration of magnesium chloride requires a large amount of water, thereby significantly increasing the weight of the heater (if the water is carried with the heater).

U.S. Pat. No. 4,819,612 discloses a container capable of heating its contents when ignited (by a match, for instance). The container holds Japanese sake, coffee, soup or other edible material and in a separate compartment contains a self-combustible exothermic material which may be a mixture of an oxidant and a combustible material. The oxidants disclosed are potassium permanganate, manganese dioxide, trilead tetraoxide, barium peroxide, bromates and chlorates. The combustible compounds disclosed are metal powders of iron, silicon, ferrosilicon, aluminum, magnesium, and copper. The preferred exothermic material is a mixture of potassium permanganate and one or more metals. As noted, the reaction is not activated by water, but by firing a fuse in the container via a match or lighter. The temperature can exceed 1000° C., thereby necessitating precautions to avoid melting the container.

U.S. Pat. No. 4,522,190 discloses a heater material for heating food and other items. It is known as the flameless ration heater (FRH) The heater is a composite of supercorroding metallic alloy powder distributed throughout a porous ultra-high-molecular-weight (UHMW) polyethylene. The supercorroding metallic alloy preferably is a powdered alloy of magnesium and iron, which when wetted with an electrolytic solution, e.g. aqueous sodium chloride, produces heat. This reaction is accompanied by the evolution of flammable and potentially explosive hydrogen gas. This system uses a magnesium/iron alloy, in a matrix of (UHMW) polyethylene producing heat by the following reaction:

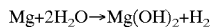

$Mg + 2H_2O \rightarrow Mg(OH)_2 + H_2$

The heat output of this reaction is 5,643 Btu/lb (dry weight). Normally, magnesium reacts very slowly with water, because of the presence of an oxide coating on the surface, which prevents further reaction. Iron is added to increase the rate of reaction with water. The major disadvantage of this system is the production of significant quantities of hydrogen gas. The FRH produces 9–10 L of hydrogen gas (at standard temperature and pressure) when used to heat one meal or U.S. Army meal, ready-to-eat (MRE). This volume of gas, which must be vented along with some of the steam produced by the heater, is an inconvenience for the user.

The quantity of hydrogen produced by the FRH device has discouraged its use in the consumer market. For example, a dangerous situation would easily occur if a functioning heater were placed in an operating microwave oven because the amount of hydrogen produced in the confined space of the oven could easily fall within the explosive limits for hydrogen in air.

U.S. Pat. No. 5,117,809 discloses a heater material utilizing the same alloy of magnesium and iron as described in U.S. Pat. No. 4,522,190, but with a different packaging arrangement. Hydrogen gas is nonetheless produced on use of the alloy. The patent also describes the use of other known exothermic reaction materials: calcium oxide, anhydrous calcium chloride, magnesium oxide, zeolite molecular sieves and silica gel—all of which react with water to give off heat.

U.S. Pat. No. 5,220,909 discloses a self-heating container which includes a tub for food. A tray containing an exothermic-chemical pad, composed of a super-corroding Mg—Fe alloy dispersed throughout a porous polymer matrix, and a pouch containing an electrolytic solution which activate the chemical pad, is welded below the tub. A pull-tab is affixed to the pouch so that the electrolytic solution contained in the pouch can be released to initiate the exothermic reaction to heat the food.

The heat source of the present invention differs from the above described systems because it employs a unique combination of chemicals to produce an amount of heat per weight of heater greater than that of many other portable heaters; does not require use of any liquid strong acids or strong bases; and does not produce any flammable by-products. The end products of the exothermic reactions are preferably close to neutral in pH and may be disposed of after use by conventional means, including disposal in a sanitary landfill. The heater of this invention is lower in weight and volume than many previously used systems.

SUMMARY OF THE INVENTION

This invention includes heat-producing compositions as well as heaters, i.e., various configurations of heat sources, and heater devices which employ the heat-producing composition. The heat-producing composition of this invention contains at least one component (a heat-releasing compound) that will release heat on hydration, i.e. on contact with water. Preferred compositions contain at least one component that will release heat on hydration and at least one component that will interact with the products of hydration to produce a substantially neutral end product optionally releasing additional heat on neutralization.

In a preferred aspect of this invention, the heat-producing composition contains a mixture of components that release heat on hydration and which generate reaction products that interact to produce a substantially neutral end product(s). More specifically, the heat-producing composition of this invention contains a mixture of an acidic anhydride or acidic salt with a basic anhydride or basic salt. Hydration of the acidic and basic species in the mixture generates heat and the acidic and basic reaction products of hydration can react to form a substantially neutral product. Preferably, the neutralization reaction of the acidic and basic products also releases heat. A variety of acidic and basic species can be combined to generate the heat-producing compositions of this invention. Preferred acidic and basic species are those that generate the highest heat output on hydration without generation of flammable, toxic or hazardous by-products or end products. Preferred mixtures of acidic and basic components are those that result after activation in a substantially neutral end product. Preferred heat-producing compositions are water-free.

Preferred heat-producing compositions of this invention can comprise a mixture of an acidic anhydride with a basic anhydride, a mixture of an acidic anhydride with a basic salt, a mixture of an acidic salt with a basic anhydride, a mixture of an acidic salt with a basic salt or combinations of these mixtures. These compositions can comprise one or more acidic anhydrides and/or acidic salts and one or more basic anhydrides and/or basic salts. These preferred compositions can contain at least one acidic anhydride or acidic salt in combination with at least one basic anhydride or basic salt.

The compositions of this invention can be prepared and activated by combining heat-producing compound or combinations of acidic and basic heat-producing compounds with any inert materials and then adding water to the combination to activate heat production. Alternatively, although not preferred, certain compositions can be prepared and activated by preparing an aqueous solution of an acidic salt and using this solution to activate a basic anhydride. Analogously, certain compositions of this invention can be prepared and activated by adding an aqueous solution of a basic salt to an acidic anhydride.

The weight ratio of acidic species (acidic anhydride and/or acidic salt) to basic species (basic anhydride and/or basic salt) in useful compositions of this invention can range from about 0.1 to about 10. The weight ratio of acidic and basic components in a given preferred composition is selected to achieve desired heat output for a given heater application and neutralization of product and to minimize cost. For a number of different acidic and basic species, a mixture with about a 1:1 weight ratio of acidic anhydride and/or acidic salt to basic anhydride and/or basic salt results in a substantially neutral product on reaction.

Preferred heat-producing compositions of this invention comprise a mixture of phosphorous pentoxide (an acidic anhydride) and calcium oxide (a basic anhydride). When water is added to this mixture, heat is produced by hydration of the phosphorous pentoxide to phosphoric acid, and hydration of calcium oxide to calcium hydroxide. Phosphoric acid and calcium hydroxide can then react to give a neutral end product. In preferred mixtures, sufficient phosphoric acid and calcium hydroxide are produced such that a substantially neutral product results after activation of the heat-producing composition.

Other preferred heat-producing compositions of this invention comprise a mixture of anhydrous magnesium chloride (an acidic salt) and calcium oxide (a basic anhydride). Preferred mixtures of magnesium chloride and calcium oxide are those that contain from about 20% to about 80% by weight of magnesium chloride. More preferred mixtures contain from about 25% to about 50% by weight magnesium chloride.

The heat-producing compositions of this invention optionally contain inert materials to regulate the rate of heat generation. Inert materials are believed to associate with the heat-producing reactants, for example, effectively coating them or forming micelles or other structures to entrap them, to retard access of water to the reactants and moderate the rate of reaction. Suitable inert materials include surface active agents (surfactants), oils, waxes, and natural or synthetic polymers or combinations thereof. Surfactants and oils, in combination with each other or in combination with waxes or polymers are more preferred inert materials. The use of a wax as the sole inert material is generally less preferred because this may lead to excessive retardation of heat production. Most generally, inert material can comprise from about 1% to about 90% by weight of the heat-producing composition. More typically, inert material is present in the range of about 1% to about 30% by weight. Preferably, the inert material represents from about 5% to 25% by weight, and more preferably from about 10% to about 20% by weight of the heat-producing composition.

For example, heat-producing compound CaO (lime) or MgO (magnesium oxide) can be combined with inert materials to regulate heat generation. Mixtures of calcium oxide and magnesium chloride and mixtures of calcium oxide and phosphorous pentoxide can also be combined with inert materials. Preferred combinations are those containing from about 1% to about 30% by weight of inert material and more preferably those containing from about 5% to about 20% by weight inert material. Preferred inert materials are combinations of surfactant and oil wherein the surfactant represents from about 15% to about 35% by weight of the inert material.

The heat-producing compositions of this invention can be used in heater configurations or heater devices in a variety of forms, for example, as powders, as roughly spherical granules, as aggregates, as pressed pads, rods, tablets or strips, as extruded pellets, rods or other shaped pieces. The heat-producing composition can be shaped, pressed or extruded before or after addition of any inert material. Alternatively, inert material can be coated or otherwise layered on shaped, pressed or extruded composition. For example, after addition of inert material the heat-producing composition can be mixed to generate aggregates or granules, which can then be sieved to obtain a desired range of particle sizes. Preferred particles sizes include about 6 mesh to about 16 mesh. Further, the heat-producing compositions can be formed into single or multi-layer heater pads, strips, tablets or like shapes, in which layers of the same or different heat-producing compositions are combined and optionally separated by porous or non-porous spacing or packaging material, such as layers of woven materials or plastic. Shaping, aggregating, pressing, extruding, pelleting, layering or other physical manipulations of the form of the heat-producing material, with or without inert materials present, can decrease the surface area of the material available for activation and thus moderate the rate of heat production on activation. Thus, the invention provides a method for regulating the rate of heat generation in heat-producing compositions by shaping, aggregating, pressing, extruding, pelleting, and/or layering to decrease the surface area of the heat-producing material available for activation.

Heaters of this invention include those which comprise a selected amount of heat-producing composition, typically retained within a container or holder, such as a porous or non-porous bag or scrim. Heat is generated from the heater when water is brought into contact with the heat-producing composition retained within the holder. The holder can be porous to allow access of water, but if non-porous is provided with some means for readily opening the holder to allow water to contact and activate the retained heat-producing material. The holder is preferably inert, heat-resistant and made of material that facilitates heat-transfer from the activated heat-producing material to an item or article that is to be heated. Heaters include, among others, porous or non-porous bags containing aggregates, pellets, rods or pads of heat-producing materials. Non-porous heater bags can be resealable to allow introduction and retention of water to activate the heater. In one exemplary configuration, the heater is a porous bag divided into separate compartments, each of which contains the same or different heat-producing compositions. In another, exemplary configuration, a heater comprises a scrim (i.e., a porous bag or other enclosure) containing a pressed pad of heat-producing material. In this configuration, the heater may have one or more pads or strips within separate compartments encased by a scrim. In another, exemplary configuration, a heater comprises a scrim containing a multi-layer pressed pad of heat-producing composition. In this configuration, layers of the pressed pad can contain heat-producing material that generates heat at different rates. For example, a slow reacting layer can be combined with a faster reacting layer. Layers can be separated by layers of inert material, scrim or plastic, for example. Heat-producing compositions that react at different rates can be produced by use of different combinations of reactants or by use of different amounts or types of inert material. Heaters can also comprise multiple pressed pads mounted on a sheet of porous or non-porous support material, such as cardboard, plastic, or heavy scrim, and optionally sealed with scrim or other porous packaging material.

A heater of the present invention preferably produces heat over a time range from about 5 to about 30 minutes after contact with water. Although heat-producing materials of this invention can be made to release their heat over a shorter time period, i.e., about one minute, the rate of heat production by the heater should be adjusted to the rate of heat transfer to the article to be heated. A heat-producing composition or heater that releases its heat in substantially less than 5 minutes is not preferred for use in heating food unless the food is maintained in a thin layer in proximity to the layer.

A heater device employing the heat-producing composition of this invention is another aspect of this invention. The device comprises a container for holding the heat-producing composition and a vessel for holding solid or liquid food (including water) or other materials to be heated. The vessel is positioned with respect to the container and the heat-producing composition therein such that on activation of the heat-producing composition heat is transferred to the vessel and the material held therein. The heat-producing composition can be in the form of powder, liquid, gel, cream or a coating on inert material. Preferably the heat-producing composition is a powder for ease of handling. More preferably it is extruded and/or pressed into pellets, rods, pads or other shapes for insertion into the container. The heater device allows for introduction of water to contact and activate the heat-producing composition. Preferably the heat-producing composition is retained within a bag, sack or other holder within the container to minimize scattering of the material or reaction products and to aid in uniform distribution of the composition in the container. The holder bag may be porous or non-porous. If the bag is non-porous, it can be opened, and optionally resealed, for addition of water or other activating solution to activate the heat-producing composition. Optionally, the device may also have a pouch or other holder for water or other activating solution which can be opened, for example by pulling a tab, to release the activating solution. The pouch is positioned in the device such that the water released can contact and activate the composition. The device optionally, but preferably, has some means for retaining the heat produced to enhance efficient heat transfer to the vessel and the material therein and to minimize heat loss to the surroundings. The device, for example, may have an outer covering, lid, box, or other holder closing or encasing the vessel and container.

This invention also encompasses methods of regulating the rate of heat production of the heat-producing composition. It also encompasses methods of heating using the heat-producing composition of this invention.

Applications of this invention encompass combinations of the present heat-producing composition with other articles. For instance, the present heaters can be combined with articles of clothing, such as gloves to provide hand-warmers. Or, for example, they can be combined with kitchenware to provide breadbaskets which keep their contents warm for extended periods.

The heat-producing compositions of the present invention, and heaters and heater devices employing them, have many advantages over prior art compositions and devices for efficient heat generation and transfer. The heaters and heater devices of this invention are stable for storage for extended periods of time, safe to use and can be readily disposed of after use.

BRIEF DESCRIPTION OF THE DRAWINGS

FIG. 3A is a side view of a heater pad having two layers pressed of heat-producing material. One of the layers is slow-acting and the other is fast-acting. Layers of polypropylene scrim are pressed on to the top and bottom of the two-layer heater pad and between the two layers. The entire pad is optionally sealed in a polymer blend scrim. The two-layer heater pad can be formed as strips for use in the pad configuration of FIGS. 2A and B.

FIG. 3B is a top view of another heater configuration of this invention. The heater comprises multiple pressed pads of heat-producing composition mounted on a backing material and encased within scrim. The heater has channels between the pads to allow access of activating solution.

FIG. 4A is a side view of a heater device comprising a container which holds a heater bag containing heat-producing composition; a vessel for holding comestibles; and a means for allowing aqueous solution to contact the heat-producing composition. Space is provided in the container for the aqueous solution and to allow for swelling of the composition upon hydration. The container optionally has a lid to cover the container and provide heat insulation.

FIG. 4B is a side view of a heater device comprising a container which holds heat-producing composition pressed into a pad; a vessel for holding comestibles; and a means for allowing aqueous solution to contact the heat-producing composition. Space is provided in the container for the aqueous solution and to allow for swelling of the composition upon hydration. The container optionally has a lid to cover the container and provide heat insulation.

DESCRIPTION OF THE SPECIFIC EMBODIMENTS

Figure 1B:
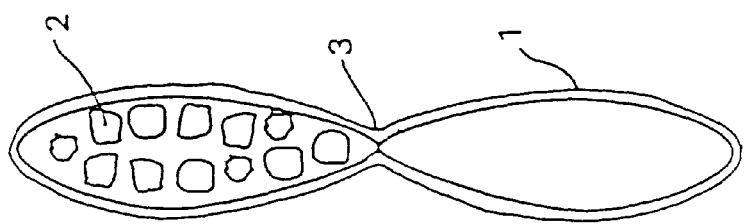
FIG. 1B is a cross-sectional side view of the heater bag of FIG. 1A.

The heat-producing compositions of this invention generally include any material that releases heat on contact with water (a heat-producing compound). Heat-producing compositions of this invention can comprise an acidic anhydride, an acidic salt, a basic anhydride or basic salt. Preferred heat-producing compositions are those in which an acidic anhydride or an acidic salt is combined with a basic anhydride or a basic salt.

Production of heat can be initiated by addition of an activating solution to the heat-producing composition. The activating solution contains water or can generate water.

Alternatively, in certain embodiments an aqueous solution containing an acidic salt (i.e., acidic solution) can be added to either a basic anhydride or basic salt to form a heat-producing composition and initiate heat production. Similarly, an aqueous solution containing a basic salt (i.e., basic solution) can be added to either an acidic anhydride or acidic salt to form a heat-producing composition and initiate heat production.

Heat can be produced by hydration of at least one of an acidic anhydride, an acidic salt, a basic anhydride or a basic salt. Additional heat can be produced by the neutralization of the acidic or basic products of hydration. In preferred combinations of heat-producing compounds, the combined heat-producing reactions yield a final product that is substantially neutral. Substantially neutral, as used herein, refers to a pH of between about 4 and about 10, and more preferably between about 6 and about 8.

The term acidic anhydride takes the common meaning in the art and thus, as used herein, refers to a substance that is derived from an acid when one or more molecules of water is removed or that becomes an acid in the presence of water. The term acidic anhydride specifically includes partially hydrated acidic anhydrides. Similarly, a basic anhydride takes the common meaning in the art and thus, as used herein, refers to a substance that is derived from a base when water is removed or that becomes a base in the presence of water. The term basic anhydride specifically includes partially hydrated basic anhydrides.

Examples of acidic anhydrides include, but are not limited to, phosphorous pentoxide ($P_2O_5$); partially hydrated acidic anhydrides, e.g., polyphosphoric acid; other non-metal oxides, for instance, $B_2O_3$ and BO; carboxylic acid anhydrides, including acetic anhydride, acetic formic anhydride, propionic anhydride, butyric anhydride, isobutyric anhydride, valeric anhydride, isovaleric anhydride, pivalic anhydride, caproic anhydride, caprylic anhydride, capric anhydride, lauric anhydride, malonic anhydride, succinic anhydride, glutaric anhydride, adipic anhydride, pimelic anhydride, phthalic anhydride, and maleic anhydride. Phosphorous pentoxide is the preferred acidic anhydride.

Examples of basic anhydrides include, but are not limited to, partially hydrated basic oxides, for instance commercial grade calcium oxide (CaO), which is well known in the art to contain some calcium hydroxide. Other examples of basic anhydrides include, but are not limited to, oxides of metals selected from: lithium, sodium, potassium, rubidium, cesium, magnesium, strontium, and barium. Hence, these oxides include $Li_2O$, $Na_2O$, $K_2O$, $Rb_2O$, $Cs_2O$, MgO, CaO, SrO, and BaO. Calcium oxide (CaO) is the preferred basic anhydride.

An acidic salt, as used herein, refers to a salt which, upon dissolution in water, causes the pH of the aqueous solution to at or below pH 7. A basic salt, as used herein, refers to a salt which, upon dissolution in water, causes the pH of the aqueous solution to be above pH 7.

Examples of acidic salts include, but are not limited to, magnesium chloride ($MgCl_2$), aluminum chloride ($AlCl_3$), zinc chloride ($ZnCl_2$), titanium tetrachloride ($TiCl_4$), ferrous w chloride ($FeCl_2$), ferric chloride ($FeCl_3$), and ferric nitrate ($Fe(NO_3)_3$). Aluminum chloride is the preferred acidic salt because of its high heat output.

Anhydrous magnesium chloride is a special case of an acidic salt, particularly useful in heat-producing compositions in combination with basic anhydrides such as calcium oxide. Upon dissolution in water magnesium chloride gives a neutral solution at about pH 7. Hydration of anhydrous magnesium chloride yields the hexahydrate or solution dependent upon the amount of water added and produces about 681 BTU/lb. Temperature approaching the boiling point of water, an aqueous solution of magnesium chloride releases HCl gas. It is desirable in portable heater applications that the residual products after activation and heat release are not strongly acidic or basic and preferably are close to neutral pH. Combinations of magnesium chloride and calcium oxide when combined with water, release significant amounts of heat and the residual solids remaining after activation are near neutral pH because calcium hydroxide and magnesium chloride in aqueous solution react to give insoluble magnesium hydroxide ($Mg(OH)_2$) and calcium chloride ($CaCl_2$). For purposes of this invention and use in heat-producing compositions herein anhydrous magnesium chloride is an acidic salt because it functions as an acidic salt to neutralize products of water activation.

Examples of basic salts include, but are not limited to, sodium acetate, sodium benzoate, and potassium ascorbate. Sodium acetate is the preferred basic salt.

Preferred materials for use in the heat-producing composition of this invention have one or more of the following desirable properties: 1) relatively high heat output per weight on hydration; 2) high heat output on neutralization; 3) low cost; 4) production of non-toxic products; 4) production of non-flammable products; 5) production of substantially neutral products 6) formation of insoluble products.

The useful compositions of this invention may reflect a balance of desirable and non-desirable properties. For example, the hydration of some acidic salts may lead to undesirable formation of acidic gas, e.g., the hydration of $TiCl_4$ or $AlCl_3$ leads to formation of HCl gas. However, $AlCl_3$ is a preferred acidic salt of this invention because of its relatively high heat output.

Phosphorous pentoxide is a preferred acidic anhydride because of its low cost; high heat output per weight on hydration; high heat output on neutralization (because $H_3PO_4$ is a strong acid); production of non-toxic products; and its formation of an insoluble salt with calcium oxide.

Calcium oxide is a preferred basic anhydride because of its low cost; relatively high heat output per weight on hydration; high heat output on neutralization; production of non-toxic products; and its formation of an insoluble salt with $H_3PO_4$.

The combination of phosphorous pentoxide and calcium oxide is particularly preferred because of the high combined heat output of their hydration and neutralization reactions.

Aluminum chloride is a preferred acidic salt for several reasons, analogous to those listed above for $P_2O_5$ and CaO. These include low cost; relatively high heat output per weight on hydration; high heat output on neutralization; and its formation of an insoluble product with CaO.

The combination of CaO and $AlCl_3$ is preferred because of the high combined heat output of their hydration and neutralization reactions Sodium acetate is a preferred basic salt for several reasons, analogous to those listed above. These include low cost; high heat output on neutralization; and production of non-toxic products. The combinations of sodium acetate with phosphorous pentoxide or aluminum chloride are preferred.

For ease of handling, the heat-producing reactants of this invention, that is the anhydrides and salts, should preferably be solid or liquid at room temperature, and more preferably solids.

The ratio of acidic anhydride or acidic salt to basic anhydride or basic salt in useful heat-producing compositions of this invention can vary greatly. Compositions of this invention generally include those in which the acidic anhydride or acidic salt is present in a ratio of between about 0.1 to about 10 parts by weight of the basic anhydride or basic salt. The weight ratio of components is generally selected to maximize heat output and generate a substantially neutral product. A weight excess of one or the other of the components may be required to achieve neutralization. For certain heater applications, it may be desirable to have a basic or acidic product. In such applications, the weight ratio of the components is appropriately adjusted to achieve the desired pH of the product. As will be appreciated by those of ordinary skill in the art, the weight ratio of components will depend upon the stoichiometry of the overall reactions occurring (hydrations and neutralizations), the desired product pH and the molecular weights of the components. In general, a weight ratio of the acidic and basic components of about 1:1 is preferred. The same considerations regarding relative weights of acidic and basic components apply when solutions of acidic or basic salts are added to other components.

The selection of particular heat-producing reactants depends, in addition, on the heat output desired for a particular application. More or less heat may be desired for a particular application. Alternatively, the amount of heat-producing composition used in any given application can be adjusted to obtain the desired heat output.

The heat-producing composition is activated by being contacted with an activating solution, which is an aqueous solution. That is, the heat-producing composition can be prepared by mixing an acidic anhydride or acidic salt with a basic anhydride or basic salt and then adding an aqueous solution to the mixture of reagents.

Alternatively, in an embodiment using an acidic salt, the salt can be added to water to form an aqueous solution which is then added to a basic anhydride or basic salt to form a heat-producing composition. For example, a saturated solution of ferric nitrate can be added to a basic anhydride or basic salt, thereby forming a heat-producing composition and initiating heat production. Similarly, in an embodiment using a basic salt, the salt can be added to water to form an aqueous solution which is then added to an acidic anhydride or acidic salt to form a heat-producing composition. For example, a solution of sodium acetate (a basic salt) in water can be added to phosphorus pentoxide (an acidic anhydride) to yield a heat-producing composition and initiate heat production.

This embodiment, wherein a salt is added to water or aqueous solution may provide the aqueous solution with anti-freeze properties, which may be desirable. However, in cases in which the salt is added to water or aqueous solution and then stored before being used, the heat of hydration of the salt is lost and will not contribute to the total heat produced upon adding the solution to an anhydride. Thus, it is preferable to add the salt to the aqueous solution immediately prior to adding the solution to the other component so as not to completely lose the heat of hydration of the salt. It is less preferable to add a salt to aqueous solution in this embodiment if the salt is one whose heat of hydration is large, unless the aqueous solution can immediately be added to the anhydride.

Aqueous solutions of this invention which do not contain any salt include, but are not limited to, those which may be convenient to the user, e.g., lemonade, coffee, soft-drinks, vodka (which is about 50% ethyl alcohol), orange juice, etc. Substances which contain water, e.g., mayonnaise or ketchup, can be used to activate the heat-producing composition and can be used when other sources of water are less convenient. Water is preferred. Furthermore, an anti-freeze substance, e.g., calcium chloride or propylene glycol, can be added to the water or aqueous solution to prevent freezing. The activating solution should preferably provide a sufficient amount of water to ensure substantially complete reaction (hydrations) and to allow for formation of hydrated final products, which are a heat-sink. If the temperature of the heater begins to reach an undesirably high temperature, excess heat can be lost to evaporation of the water in the hydrated final products.

As will be clear to those of ordinary skill in the art, substances incompatible with the intended application of the heater of the present invention should not be included in the activating solution.

A means for generating water can also be used to provide the activating solution. Means for generating water include, among others, heating a hydrate to release water, or releasing water by breaking an oil-in-water or water-in-oil emulsion.

Inert materials can be added to the heat-producing composition to regulate, typically to retard, the rate of production of heat. The resulting composition can be pressed into a pad; extruded into pellets or rods; or mixed into aggregates or granules. All of these physical manipulations of the material convert powders (which tend to react too rapidly) into larger particles which have a lower surface to volume ratio and tend to react in a more controlled manner, while resisting powdering.

These physical manipulations of the material into larger particles (pads, pellets, etc.) are preferably performed on the heat-producing composition after inert materials have been added/mixed into it. For instance, a mixture of $P_2O_5$ and CaO can be pressed into pellets, but without inert materials in the composition, the pellets have less mechanical strength. A mixture of $P_2O_5$ and CaO with inert materials added can be extruded into pellets. In general, the addition of inert materials to the heat-producing composition of this invention is helpful for pushing the material through the die. Other compositions, for instance a mixture of $AlCl_3$ and CaO can be made into pellets with sufficient mechanical strength to avoid powdering or crumbling. Thus, the inert materials, in some cases, provide not only for regulating the rate of heat production, but also provide for mechanical strength and good product performance over a wide range of starting temperatures.

Suitable inert materials include surfactants (surface-active agents), oils, waxes, and natural or synthetic polymeric solids. Surfactants, as used here, refers to any surface-active agents or substances which contain groups of opposite polarity and solubilizing tendencies; form oriented monolayers at phase interphases; form micelles; or have detergency, wetting, emulsifying and dispersing properties. Preferred surfactants include stearic acid and dicetyl phosphate. The most preferred surfactant is "ACTRAFOS 216" (Climax Performance Materials Corporation), which is an organic phosphate ester. Oil, as used herein, takes the meaning known to those skilled in the art and refers to any naturally occurring or synthetic liquid that is insoluble in water, such as aliphatic hydrocarbons or vegetable oils. Preferred oils are mineral oil and vegetable oils. Wax, as used herein, takes the meaning known to those skilled in the art and refers to any of a wide variety of substances including paraffin, spermaceti and vegetable wax, especially substances which are fatty acid esters with monohydric fatty alcohols. A preferred wax is paraffin. Natural or synthetic polymers, as used herein, takes the meaning known to those skilled in the art and refers to any large molecule consisting of repeated structures; it consists primarily of hydrogen and carbon, and is a solid or liquid at room temperature, and includes, among others, polyethylene and polystyrene. Useful polymers are those which coat the reactants of the heat-producing composition and regulate access of water to the reactants. Inert material composed of a mixture of surfactant and oil is preferred.

Inert materials can be in the form of beads or aggregates. Examples include, but are not limited to, polyethylene beads and polymethylmethacrylate beads. These materials can be used to help hold the heat-producing composition together.

The relative amounts of surfactant, oil, and/or wax in the inert material can vary greatly and are selected to achieve the desired rate of heat-production in a given material.

Most generally, the inert material can comprise from about 1% to about 90% by weight of the heat-producing composition. The amount of inert material included in a given composition will depend on the desired rate of heat production and the particular heat-producing components employed. Preferably, the inert material comprises from about 5% to about 50% by weight of the heat-producing composition, more preferably from about 10% to about 20% by weight of the heat-producing composition.

The degree of retardation of heat production varies with the identity and amount of the inert materials or mixture thereof, in the heat-producing composition.

The heat-producing composition of this invention, after being mixed with inert materials can have any of numerous physical textures and degrees of viscosity, e.g., it can be a solid, a gel, an emulsion, a cream, or a coating on inert materials.

It will be obvious to those skilled in the art that it will be advisable to add something to a consumer product employing the heat-producing composition of this invention which will deter people, especially children, from ingesting the composition. For example, "BITREX™" is a product which can be added to deter accidental ingestion.

A few examples of heat-producing compositions of this invention, along with their respective heat release, are given below in Table 1. In all cases the heat release per pound refers to the dry weight of the reactants, that is, the weight of the inert materials and water added are excluded.

TABLE 1

Examples of Heat-Producing Compositions*

| Acid | Base | Products | Heat Release Btu/lb* |
|---|---|---|---|
| $AlCl_3$ | MgO | $Al(OH)_3 + MgCl_2$ (aq) | 1,010 |
| $FeCl_3$ | MgO | $Fe(OH)_3 + MgCl_2$ (aq) | 630 |
| $P_2O_5$ | MgO | $Mg_3(PO_4)_2$ (s) | 846 |
| $AlCl_3$ | $Na_2O$ | $Al(OH)_3$ + NaCl (aq) | 1,678 |
| $AlCl_3 \cdot 6H_2O$ | $Na_2O$ | $Al(OH)_3$ + NaCl (aq) | 617 |
| $NaHCO_3$ | $Na_2O$ | $Na_2CO_3$ (aq) | 538 |
| $FeCO_3$ | $Na_2O$ | $Na_2CO_3$(aq) + FeO | 647 |
| $FeCl_3 \cdot 6H_2O$ | $Na_2O$ | $Fe(OH)_3$ + NaCl(aq) + $H_2O$ | 1,004 |
| $HC_2H_3O_2$ | $Na_2O$ | $NaC_2H_3O_2$ (aq) + $H_2O$ | 1,125 |
| $B_2O_3$ | $Na_2O$ | $NaBO_2$ (aq) | 1,165 |
| $B_2O_3$ | $Na_2O$ | $Na_2B_4O_7$(s) | 876 |
| $P_2O_5$ | $Na_2O$ | $Na_3PO_4$ (aq) | 1,683 |
| $P_2O_5$ | $Na_2O$ | $Na_2HPO_4$ (aq) | 1,554 |
| $(CH_3CO)_2O$ | $Na_2O$ | $NaC_2H_3O_2$ (aq) | 1,080 |
| $P_2O_5$ | CaO | $Ca_3(PO_4)_2$(s) | 1,035 |
| $FeCl_3$ | CaO | $Fe(OH)_3 + CaCl_2$ (aq) | 625 |
| $AlCl_3$ | CaO | $Al(OH)_3 + CaCl_2$ (aq) | 1,016 |
| $C_4H_4O_3$ | CaO | $CaC_4H_2O_3$ | 759 |
| $H_2C_2O_4$ | CaO | $CaC_2H_2O_4$ (aq) + $H_2O$ | 629 |
| $(CH_3CO)_2O$ | CaO | $Ca(C_2H_3O_2)_2$ (aq) | 696 |
| NONE | CaO | $Ca(OH)_2$ (s) | 501 |
| $MgCl_2$ | CaO | $Mg(OH)_2$(s) + $CaCl_2$ (aq) | 614 |

*Weight of water and inert materials is not included. These values are calculated from data in Lange's Handbook.
Estimated heat release based on the heat releases on hydration of $MgCl_2$ and the heat release of CaO reacting with water to give $Ca(OH)_2$.

The following equations describe reactions that occur in a preferred embodiment, wherein the heater composition comprises $P_2O_5$ and CaO. The associated heat production (enthalpy of the reaction, $\Delta H$) for each reaction is also given. (Here and below, the subscripts (s), (l), and (aq) denote solid, liquid, and aqueous solution respectively):

Hydration of the acidic anhydride, $P_2O_{5(S)}$:

$$P_2O_{5(s)} + 3 H_2O_{(l)} = 2 H_3PO_{4(aq)} \quad (1)$$

$\Delta H = -55.7$ kcal/mole $P_2O^{5(aq)}$

Hydration of the basic anhydride, $CaO_{(s)}$:

$$CaO_{(s)} + H_2O_{(l)} = Ca(OH)_{2(s)} \quad (2)$$

$\Delta H = -15.6$ kcal/mole $CaO_{(s)}$

The following neutralization reactions are possible:

$$2 H_3PO_{4(aq)} + 3Ca(OH)_{2(s)} = Ca_3(PO_4)_{2(s)} + 6 H_2O_{(l)} \quad (3)$$

$\Delta H = -77.1$ kcal/mole $Ca_3(PO_4)_{2(s)}$ $$H_3PO_{4(aq)} + Ca(OH)_{2(s)} = CaHPO_4 \cdot 2 H_2O_{(s)} \quad (4)$$

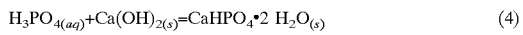

$\Delta H = -32.8$ kcal/mole $CaHPO_4 \cdot 2 H_2O_{(s)}$

Therefore, the following overall reactions can occur:

$$P_2O_{5(s)} + 3CaO_{(s)} = Ca_3(PO_4)_{2(s)} \quad (5)$$

$\Delta H = -179.6$ kcal/mole $Ca_3(PO_4)_{(s)}$ $$P_2O_{5(s)} + 2CaO_{(s)} + 5 H_2O_{(l)} = 2 CaHPO_4 \cdot 2 H_2O_{(s)} \quad (6)$$

$\Delta H = -152.4$ kcal/2 moles $CaHPO_4 \cdot 2 H_2O_{(s)}$

If the process follows the course shown by reaction (5), the individual reaction contributions are as follows:

TABLE 2

Heat Production for Reaction (5)

| Reaction | $\Delta H$, kcal/mole | % of total |
|---|---|---|
| (1) 2 moles $H_3PO_{4(aq)}$ formed | 55.7 | 31.0 |
| (2) 3 moles $Ca(OH)_{2(s)}$ formed | 46.8 | 26.0 |
| (3) 1 mole $Ca_3(PO_4)_{2(s)}$ formed | 77.1 | 43.0 |
| (5) overall reaction | 179.6 | 100.0 |

Heat production of stoichiometric reaction: 1043 btu/lb

If the process follows the course shown by reaction (6), the individual reaction contributions are as follows:

TABLE 3

Heat Production for Reaction (6)

| Reaction | $\Delta H$, kcal/mole | % of total |
|---|---|---|
| (1) 2 moles $H_3PO_{4(aq)}$ formed | 55.7 | 36.5 |
| (2) 2 moles $Ca(OH)_{2(s)}$ formed | 31.2 | 20.5 |
| (4) 2 moles $CaHPO_4 \cdot 2H_2O_{(s)}$ formed | 65.6 | 43.0 |
| (6) overall reaction | 152.5 | 100.0 |

Heat production of stoichiometric reaction: 1080 btu/lb

As the data in Tables 2 and 3 above make clear, all three of the component reactions (hydration of acidic anhydride, hydration of basic anhydride, and neutralization) can make substantial contributions to the overall heat production. The exact nature of the neutralization reaction (i.e., reaction (5), (6), related reactions, or some combination thereof) does not greatly affect the overall heat production as a function of the weight of reactants. The formation of a hydrate, such as $CaHPO_4 \cdot H_2O$, has advantages in that the water used for activation is taken up by the heater composition, giving a final product that is solid rather than liquid. A solid product is cleaner and more convenient to dispose, and has minimal environmental impact. A further advantage of water present in the used heater in the form of a hydrate is that, in the event that the heater reaches an excessive temperature, the water of hydration will be driven off, producing a cooling effect.

For example, if a portable heater device prepared by other methods is activated in the absence of a suitable heat sink, the adiabatic temperature can easily be high enough to present a fire hazard, or to cause undesirable fumes or odors from the heater or packaging material. It is an advantage of the present invention that the loss of water of hydration can limit such excursions to high temperature.

The weight ratio of $P_2O_5$ to CaO is preferably 1:1 because this allows for a stoichiometric excess of CaO, which is desirable for several reasons. First, there is a tendency for the surface of the heater to become acidic during use, and CaO (excess) raises the pH of the heater. Second, CaO is cheaper than $P_2O_5$ by a factor of about 10.

Another embodiment of the heat-producing composition of this invention uses $AlCl_3$ (an acidic salt) with CaO (a basic anhydride).

The following reactions may occur in a heater using $AlCl_3$ and CaO:

Hydration of the acidic salt:

$$AlCl_{3(s)} = AlCl_{3(aq)} \quad (7)$$

$\Delta H = -78.35$ kcal/mole $AlCl_{3(aq)}$

Hydration of the basic anhydride:

$$CaO_{(s)} + H_2O_{(l)} = Ca(OH)_{2(s)} \quad (2)$$

$\Delta H = -15.6$ kcal/mole $CaO_{(s)}$

Neutralization:

$$2 \text{AlCl}_{3(aq)} + 3 \text{Ca(OH)}_{2(s)} = 3 \text{CaCl}_{2(aq)} + 2 \text{Al(OH)}_{3(s)} \quad (8)$$

$\Delta H = -42.4$ kcal/3 mole $\text{CaCl}_{2(aq)}$
The overall reaction is as follows:

$$2 \text{AlCl}_{3(s)} + 3 \text{CaO}_{(s)} + 3 \text{H}_2\text{O}_{(l)} = 3 \text{CaCl}_{2(aq)} + 2 \text{Al(OH)}_{3(s)} \quad (9)$$

$\Delta H = -245.8$ kcal/3 moles $\text{CaCl}_{2(aq)}$
The individual reaction contributions are as follows:

TABLE 4

Heat Production for Reaction (9)

| Reaction | $\Delta H$, kcal/mole | % of total |
|---|---|---|
| (7) 2 moles $\text{AlCl}_{3(aq)}$ formed | 156.7 | 63.7 |
| (2) 3 moles CaO formed | 46.8 | 19.0 |
| (8) 3 moles $\text{CaCl}_{2(aq)}$ formed | 42.4 | 17.3 |
| (9) overall reaction | 245.9 | 100.0 |

Heat production of stoichiometric reaction: 1017 Btu/lb.

This embodiment ($\text{AlCl}_3$ with CaO) is less preferred than the $\text{P}_2\text{O}_5$/CaO mixture because an additional reaction likely occurs to some extent as well:

$$\text{AlCl}_{3(s)} + 3 \text{H}_2\text{O}_{(l)} = \text{Al(OH)}_{3(s)} + 3 \text{HCl}_{(g)}$$

The production of HCl gas is not desirable. CaO mixed primarily with an acidic salt, aluminum chloride, yields a heat-producing composition when mixed together as powders or as aggregates. The rate of heat production is well controlled (by addition of inert materials and pressing or extrusion) and produces a high heat output.

Heaters ($\text{AlCl}_3$ with CaO) were prepared using the ingredients shown below:

TABLE 5

Heat generation of reaction by $\text{AlCl}_3$ and CaO with $\text{H}_2\text{O}$

| | | | Conditions | | |
|---|---|---|---|---|---|
| Sample | $\text{AlCl}_3$, g | CaO, g | PARANOX 100,* % | pressure, psi | Heat output, % of theory |
| 1 | 3.178 | 2.005 | 5 | 24000 | 69 |
| 2 | 5.292 | 3.344 | 5 | 12000 | 66 |
| 3 | 3.668 | 2.310 | 2.5 | 6000 | 68 |

*"PARANOX 100" (Exxon Corporation) is an oil-soluble surfactant with the following structure:

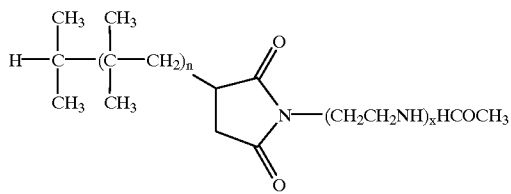

where n is 10–60 and x is 3–10, which is a polyamine succinimide surfactant.

The preferred heater of this invention comprises a $\text{P}_2\text{O}_5$/CaO composition. The prior art does not suggest the preferred ($\text{P}_2\text{O}_5$/CaO) heat-producing composition of the present invention. In fact, the combination or phosphorous pentoxide and calcium oxide is explicitly discouraged and advised against in handbooks about hazardous materials because $\text{P}_2\text{O}_5$ and CaO can react violently.

The term heater as used herein refers to a shaped article (shaped by the physical manipulations described above, for instance) or a bagged article comprising the heat-producing composition/material. And more simply, the term heater refers to a selected amount of heat-producing composition confined within a container or holder. FIGS. 1–3 illustrate heaters of this invention.

The term heater device as used herein, refers most generally to a heater, as defined herein, inside a container. FIGS. 4A and B, 6A and B, and 7 illustrate heater devices of this invention. The elements of these figures are not necessarily drawn to scale.

Figure 1A:
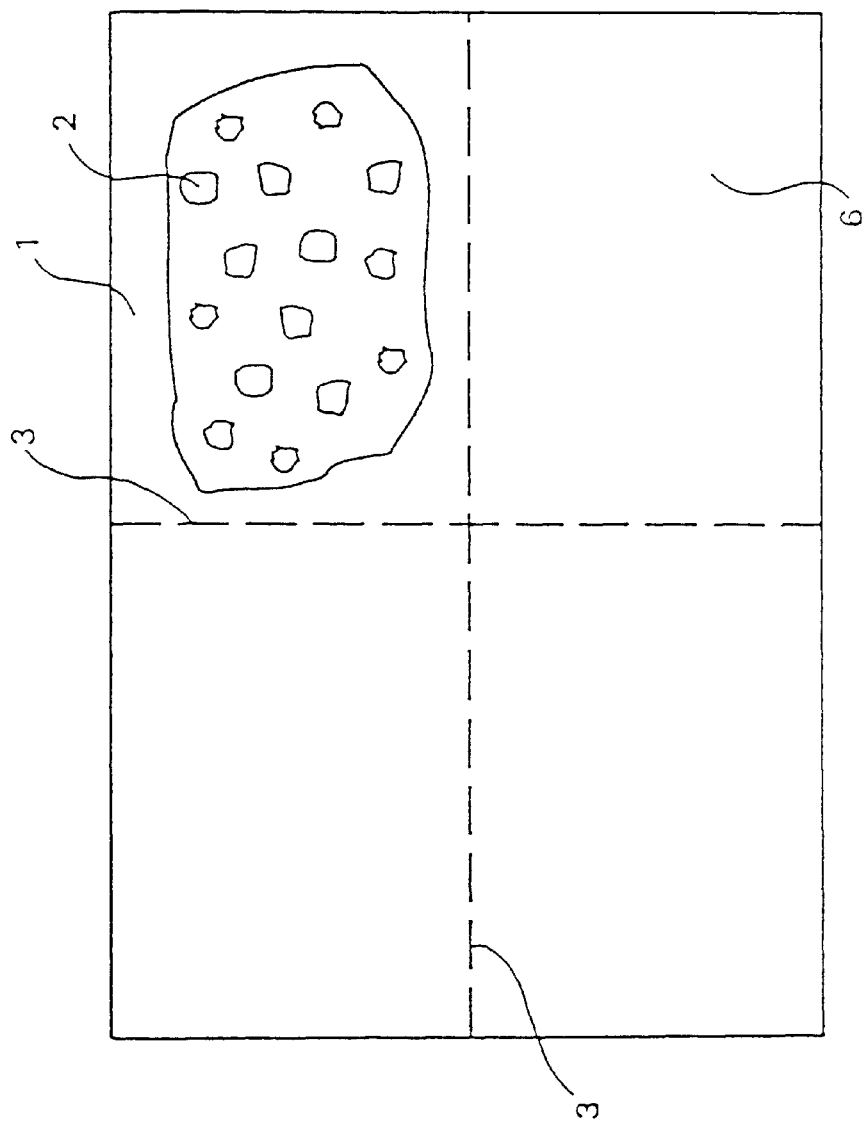
FIG. 1A is a schematic top view of multicomponent bag containing the heat-producing composition in the form of small pellets. The bag is a porous scrim, which is heat-sealed to form four compartments in such a way that the internal seams (indicated by dashed lines) separate the pellets into compartments to prevent shifting of pellets from one end or side of the bag to another.

FIG. 1A shows a top view of a heater comprising heat-producing composition within a porous scrim (1). A portion of the scrim is cut away showing the heat-producing composition in the form of pellets (2). The scrim is divided into four separate compartments (6) by seals or seams (3) in the scrim. The seals prevent the pellets from shifting to one end or side of the bag. The use of multi-compartment heaters facilitates more even distribution of heat-producing composition in the heater and more even heating. FIG. 1B is a cross-section of the heater of FIG. 1A. The heat-producing composition is activated by contacting the porous scrim with water.

Figure 2A:
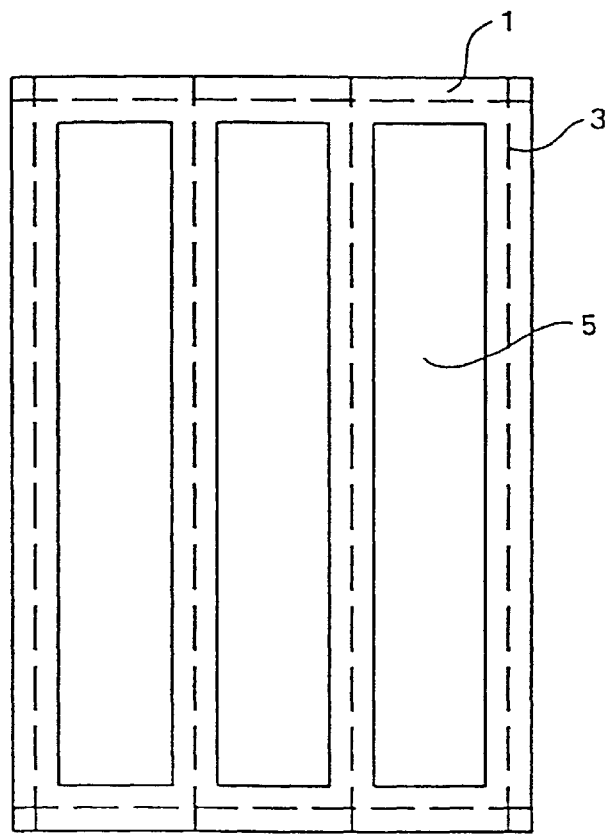
FIG. 2A is a top view of a three-strip bag containing pressed pads of the heat-producing composition. Channels formed between the pads allow for increased contact of the heat-producing material with the activating solution. A pad of phosphorous pentoxide and calcium oxide can be used in a heater device to heat an 8–10 ounce meal. Dashed lines indicate heat-sealing of a scrim around all sides of each strip.
Figure 2B:
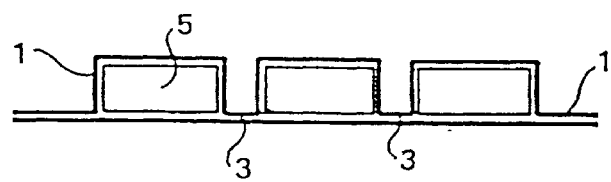
FIG. 2B is a side view of the bag of FIG. 2A.

FIG. 2A is a lateral cross-section of another heater of this invention, having three compartments for receiving strips of pressed heat-producing composition. The heater is encased in a scrim (1) with seams (3) separating the compartments. Each compartment contains a strip (5) of pressed composition. FIG. 2B is an cross-section of the heater of FIG. 2A showing single-layer strips in the compartments. The heat-producing composition is activated by contacting the porous scrim with water.

FIG. 3A is a cross-section of another heater configuration of this invention wherein the heat-producing composition is formed into a multi-layered pad. A first pressed layer (10) is separated from a second pressed layer (11) by a polypropylene scrim layer (12). Additional layers (13 and 14) of polypropylene scrim are pressed onto the top of the first layer and onto the bottom of the second layer, respectively. The multi-layered pad is heat-sealed within an outer polymer blend scrim (1). In a preferred embodiment of the configuration of FIG. 3 the first layer comprises a slower-acting material and the second layer comprises a faster-acting material. The two layers differ in the amount of inert materials added to the heat-producing composition. The slower-acting layer contains more inert material than does the faster-acting layer. The heat-producing composition is activated by contacting the porous scrim with water. The multi-layered pad can also be formed as strips for use in the heater of FIGS. 2A and 2B.

FIG. 3B is a top view of another heater configuration of this invention. The heater comprises multiple pressed pads (5) of heat-producing composition mounted on a backing material (15) and encased within scrim. The heater has channels (16) between the pads (5), to allow access of activating solution. The pads can be in various shapes, e.g. squares or rectangles. A layer of porous scrim (1) encases the pads and covers the top of the heater. The heater performance in this embodiment is closely related to the channel spacing between the squares as well as the number of squares. In general, it was found that increasing the number of pads, and therefore the number of channels, led to more efficient heat production. This allows for increased penetration of the activating solution into the heater pads. A heater with nine pads is a preferred. A heater with 20 squares is more preferred. Heater pads ($CaO/P_2O_5$ in 1:1 weight ratio with Brij 30 surfactant, oil, and wax), approximately 0.75" to 1.5" in length and width, perform well when used in conjunction with channels about 0.2" to about 0.25" in width and water amounts that are about 50% of the pad weight. Brij 30 surfactant is a non-ionic ethoxylated alcohol surfactant designated polyethylene (4) lauryl ether which has the structure: $CH_3(CH_2)_{10}CH_2(CH_2CH_2)_4OH$.

Smaller squares may be beneficial when using low water levels. With smaller squares, all parts of the heater pad can be evenly exposed to the water before it becomes permanently hydrated into the reactants.

As illustrated in FIGS. 1–3, the heater of this invention has several embodiments or configurations, which can be used with any heat-producing composition of this invention.

A heater using a single heat-producing composition is one embodiment of this invention. The heat-producing composition can be mixed with inert materials and pressed into a single-layer pad. Preferably, the pad is pressed at about 10,000 psi. Preferably, the single-layer pad comprises strips as is FIGS. 2A and 2B.

Another embodiment of the heater of this invention involves a single heat-producing composition, extruded into pellets which are then placed into a scrim. (FIGS. 1A and 1B) This is the preferred mode for the heater, mainly because of its simplicity (preparing and using just one heat-producing composition is simpler than preparing and mixing two or more compositions). Extruding the material into pellets is, in many cases, the preferred embodiment for the heater; the pellets are less likely to crumble during shipping than are pads and rods. An example of this embodiment is given in Example 1 below.

Another embodiment of the heater of the present invention is a single-layer article which comprises a mixture of two or more compositions which produce heat at different rates, based on the relative concentrations of inert materials added to the heat-producing reagents. These compositions can be prepared separately, and then combined as powders or aggregates. This mixture can then be pressed into a pad (FIGS. 2A and 2B and 3) or extruded into pellets and sealed in a scrim (FIG. 1). An example of this embodiment is described in Example 2 below.

Yet another embodiment of the heater of the present invention is a multi-layer heat-producing article (as in FIG. 3), wherein the layers contain the same heat-producing composition, but the layers differ in the relative concentration of inert materials added. The layers containing higher amounts of inert materials will produce heat at a slower rate than the layers containing lower amounts of inert material. The layers can be in any of a number of physical forms, including but not limited to, pressed pads or pellets in a scrim. This embodiment allows for a quick production of heat (by the faster-acting layer) and a sustained production of heat (by the slower-acting layer). In this embodiment, it is preferred to put the slower-acting layers closer to the object to be heated. This embodiment is illustrated in Example 3 below.

The heaters of the present invention can be improved by coating the scrim with a basic anhydride. For example, calcium oxide can be suspended in a volatile solvent and spray-coated onto the inner surface of the outer scrim encapsulating the heater pad. The solvent acts as a carrier for the CaO powder but evaporates off the heater surface leaving behind a thin, continuous coat of CaO. The CaO forms a barrier which retards moisture vapor transmission to the heater surface. The thin solid layer impedes moisture to the heater surface by acting as a desiccant to absorb water vapor before it reaches the heater. Upon activation, the coat is dissolved quickly by water or an aqueous solution and does not decrease the heat production rate or the heat output. This process of coating the scrim with CaO improves the stability on storage of the heat-producing composition and increases the effective shelf life of the pad.

It should be noted that heaters of the present invention are particularly useful in portable heater devices for heating solid or liquid foods, including water. The heaters of this invention can be employed in a variety of heating device configurations. For example, the heat-producing composition and heaters of this invention can be employed in prior art heater devices, such as those described above (Background of the Invention). Several heater device configurations are exemplified in the Figures.

A heater device of this invention comprises a heat-producing composition comprising an acidic anhydride or acidic salt and a basic anhydride or basic salt; a container for holding the heat-producing composition; a vessel for food or other comestibles; and a means for introducing an activating solution to contact and activate said heat-producing composition for the production of heat. The container and vessel are positioned with respect to each other to allow for heat transfer from the activated heat-producing composition to the vessel and the contents thereof. The heat-producing composition may be in the form of a heater as described herein. The heat-producing composition of the heater device may be in the form of rods, pellets, pads, or granules which may or may not be enclosed in a bag. The bag may be porous (scrim) or non-porous. If non-porous, a means for opening the bag to allow activating solution to contact the heat-producing composition must be provided. Optionally, the heater device contains a source of activating solution which can be opened to introduce activating solution to contact the heat-producing composition. The heater device is optionally enclosed within an outer sack or holder which can provide heat insulation. Alternatively, heat insulation can be provided in certain embodiments by use of a lid or other closure.

FIG. 4A is a schematic drawing of a heater device of this invention with container (20) holding the heater (4) of FIGS. 1A and 1B. The food vessel (21) is a polyethylene bag. Activating solution (22) can be poured into the container via an opening (24) to activate the heater. The heater device optionally has a lid (23), which may be a flap which may be closed over the top of the container. Space is allowed in the container to accommodate the activating solution and swelling of the heater.

FIG. 4B is a schematic heater device of this invention with container (20) holding the heater (4) of FIGS. 2A and 2B. The food vessel (21) is a polyethylene bag. Activating solution (22) can be poured into the container via an opening (24) to activate the heater. The heater device optionally has a lid (23), which may be a flap which may be closed over the top of the container.

Figure 5:
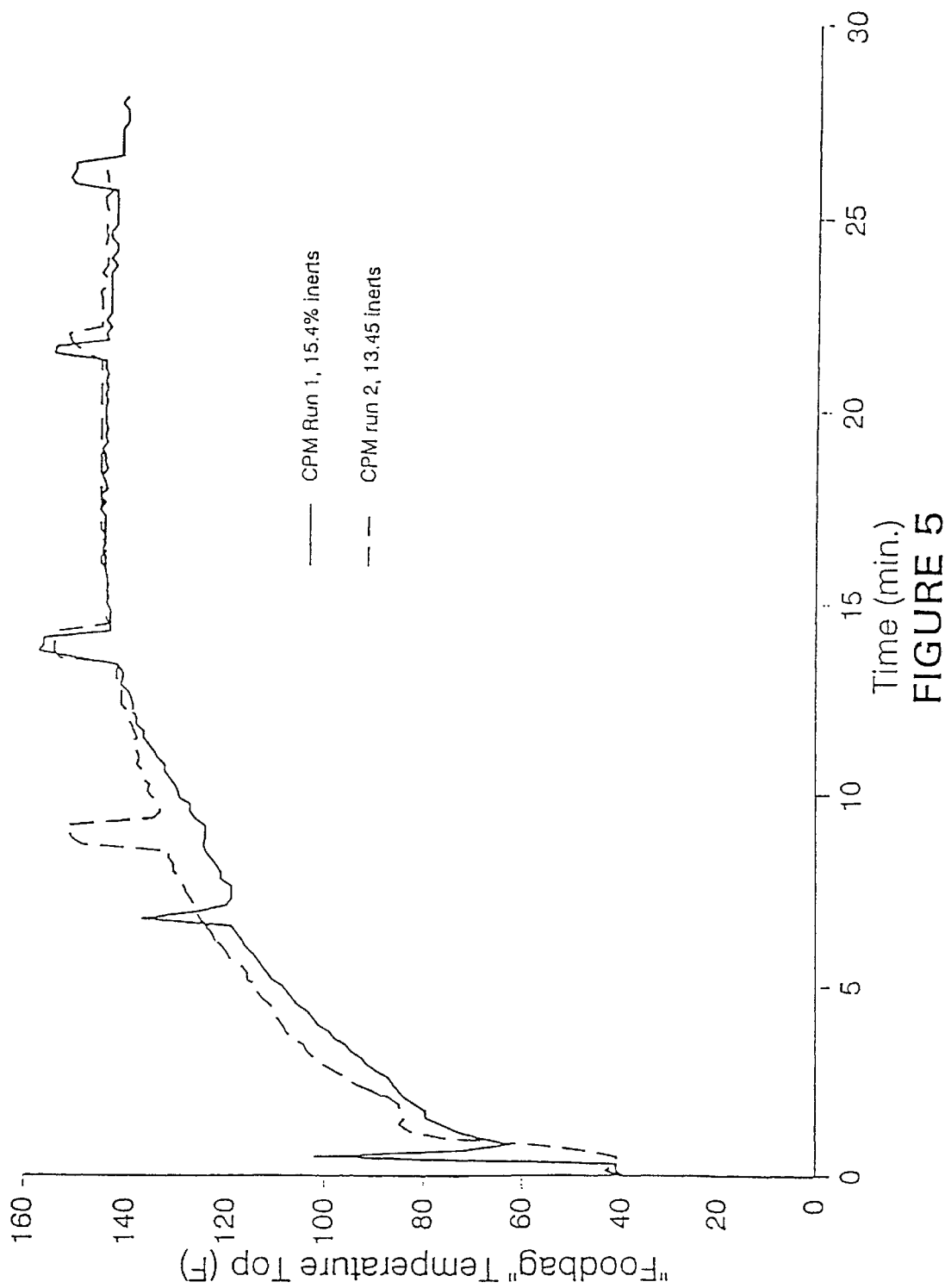
FIG. 5 shows heating curves for a heater device of FIG. 4A. The food vessel contains 8 oz. of water (simulated food) and is heated by addition of about 30 mL of water to 60 g of an extruded composition. The heat-producing composition was prepared by mixing CaO and $P_2O_5$ in equal weight ratios, adding 13.4% (dashed line) or 15.4% (solid line) of a liquid consisting of 74% white mineral oil and 26% surfactant "ACTRAFOS™"

FIG. 5 shows heating curves for a heater device of FIG. 4A. The food vessel contains 8 oz. of water (simulated food) and is heated by addition of about 30 mL of water to 60 g of an extruded composition. The heat-producing composition was prepared by mixing CaO and $P_2O_5$ in equal weight ratios, adding 13.4% (dashed line) or 15.4% (solid line) of inert material, a liquid consisting of 74% white mineral oil and 26% surfactant "ACTRAFOS 216".

Figure 6A:
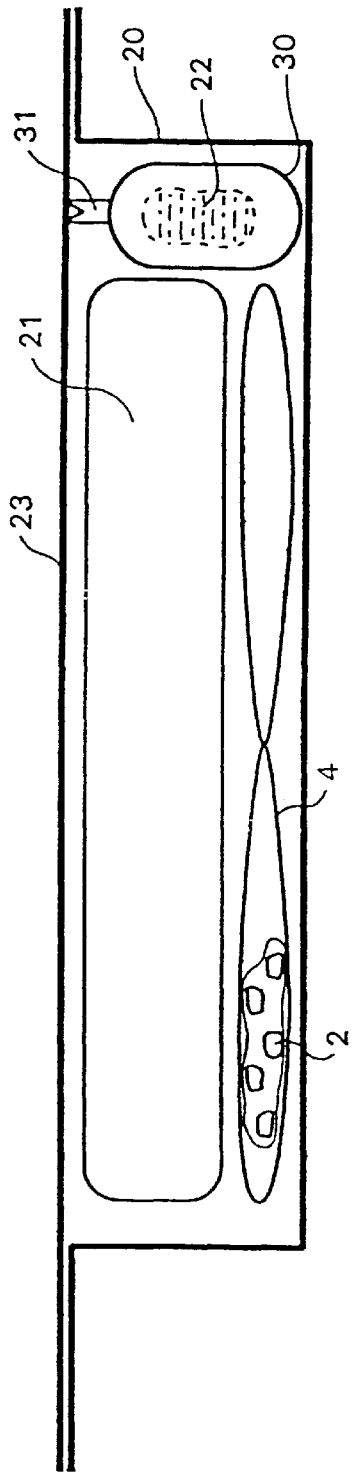
FIG. 6A is a side view of one exemplary heater device comprising a container which holds a porous scrim containing the heat-producing composition; a vessel for holding comestibles; a pouch containing activating solution, and a pull-tab on the pouch for allowing water to exit the pouch and contact the heat-producing composition. Space is provided in the container for swelling of the composition upon hydration. The container is optionally provided with a lid. The heat-producing composition is activated by opening the pouch of activating solution.

FIG. 6A is another heater device of this invention with container (20) holding a multi-compartment heater (4) containing pellets (2). The container also holds a food vessel (21) and a pouch (30) of activating solution. The pouch has a means for allowing activating solution (22) to be released to contact and activate the heat-producing composition. Pouch (30) is illustrated with a pull-tab (31). (U.S. Pat. No. 4,771,761 and U.S. Pat. No. 4,559,921 illustrate pull-tabs and tearing devices.)

Figure 6B:
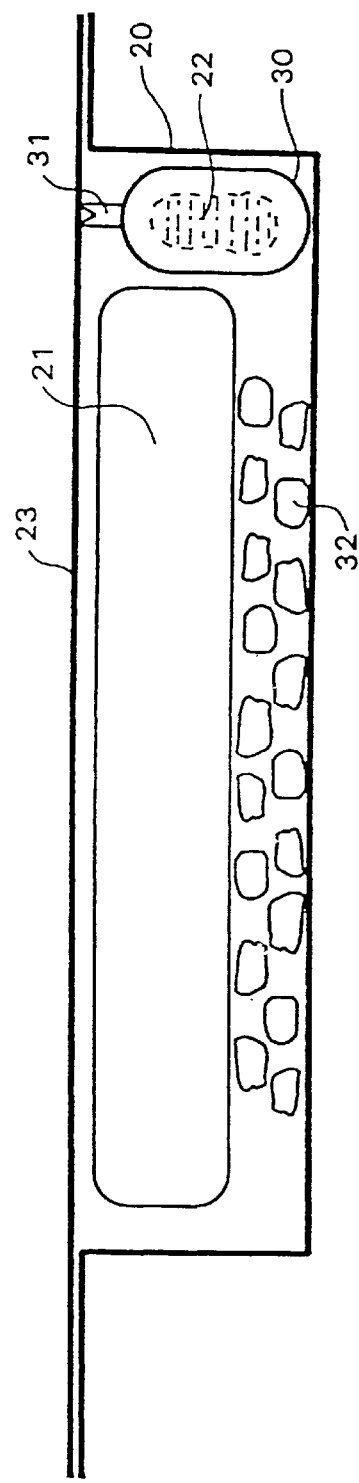
FIG. 6B is a side view of a fourth exemplary heater device wherein the container holds heat-producing composition (no bag or scrim is employed). The heat-producing composition is in the form of pellets or granules which are not contained in a bag. A pouch containing an activating solution, and a pull-tab on the pouch for allowing the solution to exit the pouch and contact the heat-producing composition, is positioned as shown, to the side of the composition.

FIG. 6B is another heater device of this invention with container (20) holding heat-producing composition in the form of loose granules (32). The pad is illustrated without a bag. The container also holds a food vessel (21) and a pouch (30) of activating solution. The pouch has a means for allowing activating solution to be released to contact and activate the heat-producing composition. Pouch (30) is illustrated with a pull-tab (31).

The loose granules may contain both components of the heat-producing composition, i.e. both an acidic and a basic reactant of this invention. In this aspect of the invention, the activating solution is an aqueous solution. Alternatively, the loose granules may contain only an anhydride. In which case, the activating solution contains a salt which reacts with the anhydride in the granules. Preferably the solution is a concentrated salt solution. For example, in this embodiment, if the anhydride in the granules is acidic, then the activating solution must contain a basic salt. One of ordinary skill in the art recognizes that adding a basic salt to water generates a basic solution. The basic solution functions to neutralize the acid which is formed in the heater by hydration of the acidic anhydride. Similarly the acidic solution formed by adding an acidic salt to an aqueous solution functions to neutralize the base which is formed in the heater by hydration of the basic anhydride.

Figure 7:
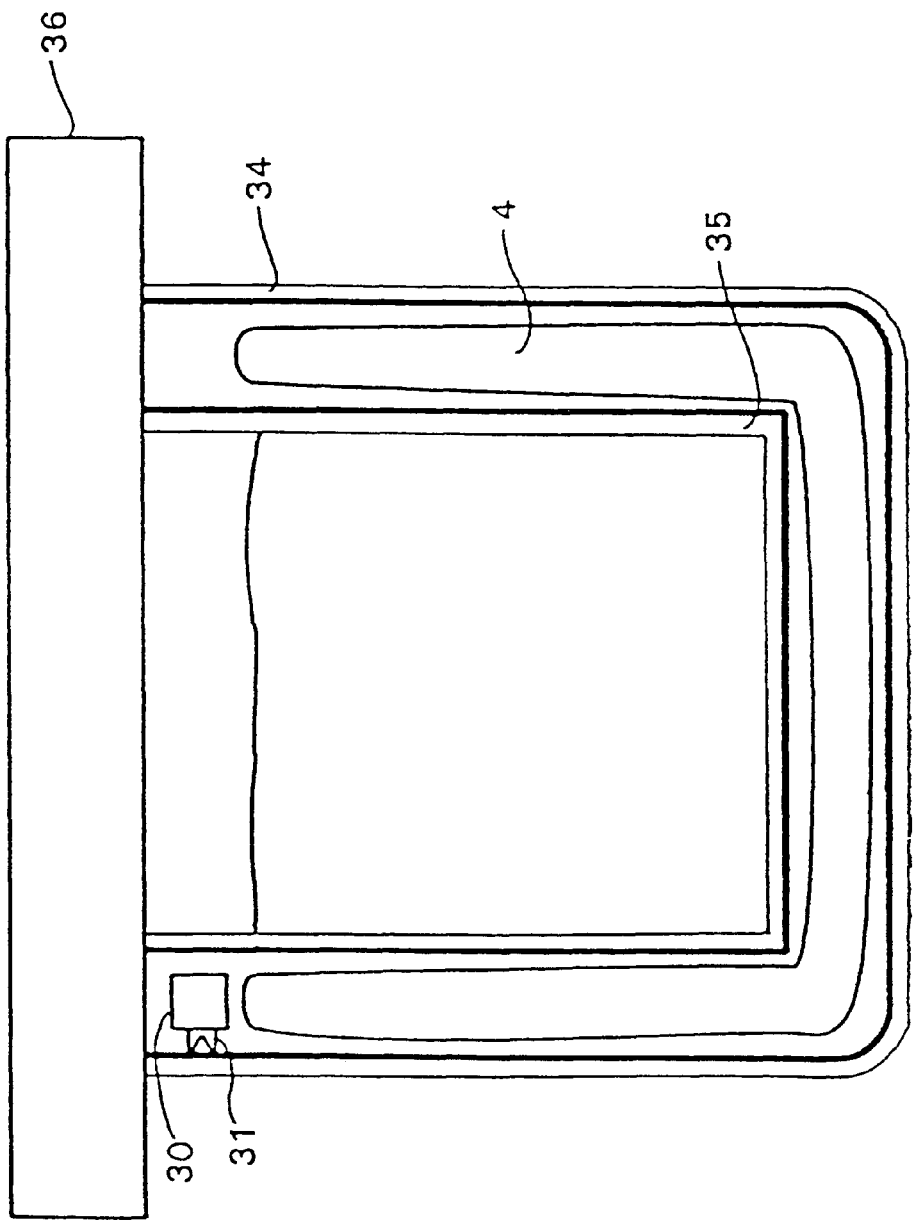
FIG. 7 is a side view of yet another exemplary heater device in a "cup within a cup" embodiment. The outer cup contains the heat-producing composition, which may be pressed and shaped to fit between the outer cup and the inner cup.

FIG. 7 is a side cross-section of another heater device of this invention, a "cup-within-a-cup" configuration. An outer cup (34) holds a heater (4) comprising a heat-producing composition and an inner (smaller) cup (35) is inserted in the larger outer cup in contact with the heater (4). Activating solution can be poured into the outer cup to contact and activate the heat-producing composition. Alternatively, a pouch (30) with pull-tab (31) containing activating solution can be provided within the outer cup. The heater device is optionally provided with a lid (36).

Alternatively, the heat-producing composition may be in the form of pellets, preferably contained in a scrim. An inner cup fits inside the outer cup. The inner cup is substantially surrounded by the heat-producing composition. Solid or liquid food or other material to be heated is in the inner cup. The inner cup is the vessel for food in this embodiment of the heater device. Activating solution, e.g., water, is poured into the outer cup to activate the heat-producing reactions. Optionally, a lid may be included in the device. Optionally, a pouch (containing aqueous solution) with a pull-tab or other means for allowing the aqueous solution to contact the heater may be included in the space between the inner and outer cups.

The vessel of these devices is adapted to contain solid or liquid food or other comestibles and can be made of plastic, metal, ceramic or water-resistant or water-proof paper products. Preferably, the vessel is water-proof, so as to keep the food contents uncontaminated by the other elements of the device. Also it preferably is not substantially affected by the temperatures attained by the heater.

The heater device comprises a container which holds heater elements and, optionally, sources of activating solution such that heat is transferred from the heat-producing material to the food vessel. The container can be made from plastic, waxed cardboard, metal, ceramic or any other material with sufficient strength to contain the elements of the device (including the activating solution upon being added to the heater) and sufficient insulating properties to increase the amount of heat produced which is transferred to the material to be heated, and to minimize the amount of heat lost to the surroundings. The container can be made from flexible material, e.g., a plastic sack, or it can be made from rigid material, e.g., a waxed cardboard box. The container is preferably made of material which has insulating properties so that the user is not burned. The container does not need to be water-proof, but preferably is made of a material or coated material which holds the majority of activating solution for about 1–2 minutes allowing for the heater to absorb said solution.

The heater device comprises a means for allowing an activating solution to contact the heat-producing composition. The means for doing so can include pull-tabs and tearing devices on either or both the heater bag and water pouch. Another means for allowing an activating solution to contact the heat-producing composition is a perforated hole in the water pouch which can easily be pierced, for instance with a toothpick or fork tine. Another means for allowing an activating solution to contact the heat-producing composition is a container of aqueous solution contained in an easily broken container, which is packaged with the heater and breaks upon shaking the heater.

The bag containing the heat-producing composition of this invention is preferably a porous scrim made of plastic, tea-bag material, cotton, or polymers, like nylon. The porosity allows for the activating solution to contact the contents of the bag, i.e., the heat-producing composition. FIG. 4 shows an embodiment of the heater device which does not include an activating solution. The user of the device supplies the activating solution and pours it into the container, which provides ample space for addition of said activating solution and the swelling of the heat-producing composition upon addition of said activating solution. A porous scrim bag contains the heat-producing composition in the form of pellets. The bag has seals/seams to allow for better contact of the activating solution with the heater. A lid is optional.

However, the bag does not have to be porous. The bag may be equipped with a pull-tab or other tearing element which opens the bag and allows activating solution to enter the bag.

The optional outer holder may be a polyethylene sack to hold the heater, food vessel, and activating solution, inside the container. A sack of this type is necessary only if the container is made of a material which cannot hold the majority of the activating solution (upon addition to the heater) for about 1 to 2 minutes while the heater is absorbing said solution.

It will be recognized by those skilled in the art that the relative positioning of the heater with respect to the material to be heated can be determined by routine choice without undue experimentation. The examples herein show only a few possible arrangements of the heater with respect to the material to be heated.

Figure 8:
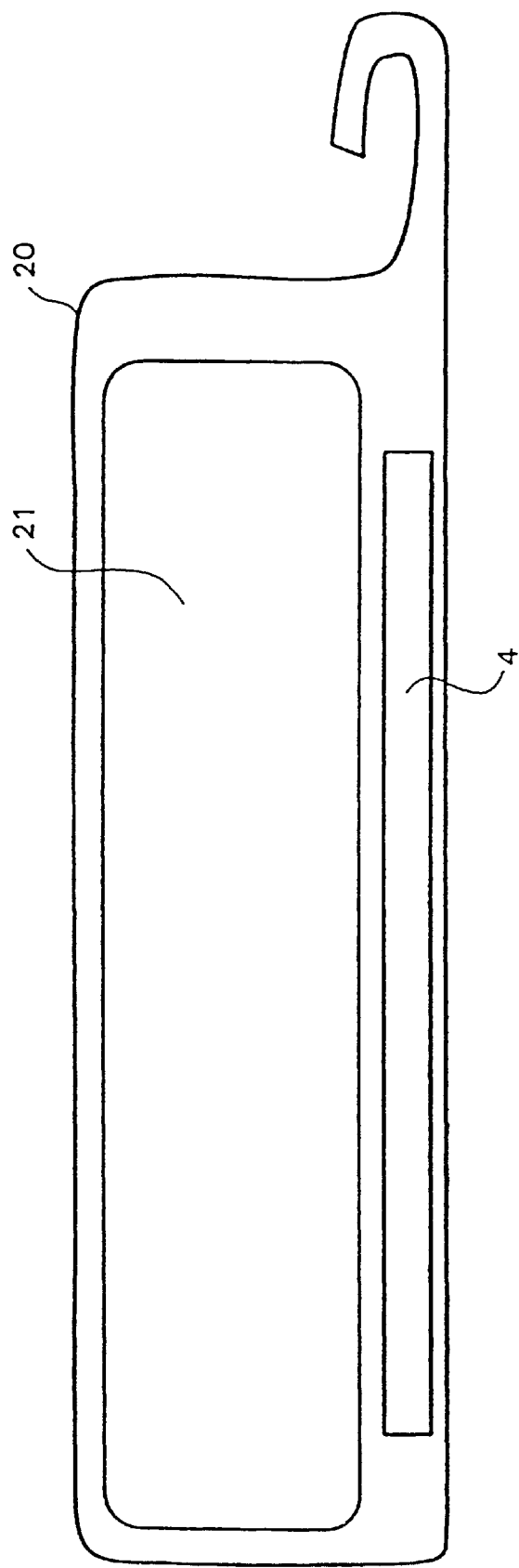
FIG. 8 is a side view of a heater device configuration in which a heater pad and food vessel are inserted into an outer flexible container. The heater pad is activated by opening the flexible container and introducing water. The sack is then closed (or folded over) to facilitate heat transfer to the food.

FIG. 8 shows a heater device wherein the container (20) is an open-ended aluminized Mylar sack containing the heater pad (4) and food vessel (21). The aluminized Mylar sack keeps moisture away from the heater so that the heater remains dry until its use is desired. The sack can be opened and resealed (either by folding over and/or clipping sack shut with a clip or by a zip-locking mechanism). In FIG. 8 the sack is shown closed by folding over.

FIGS. 9–12 show temperature profiles for the "food" vessel and for the heater and demonstrate that the heater can raise the temperature of the "food" vessel by about 75–130 degrees (F) in about 12 minutes.

Figure 9:
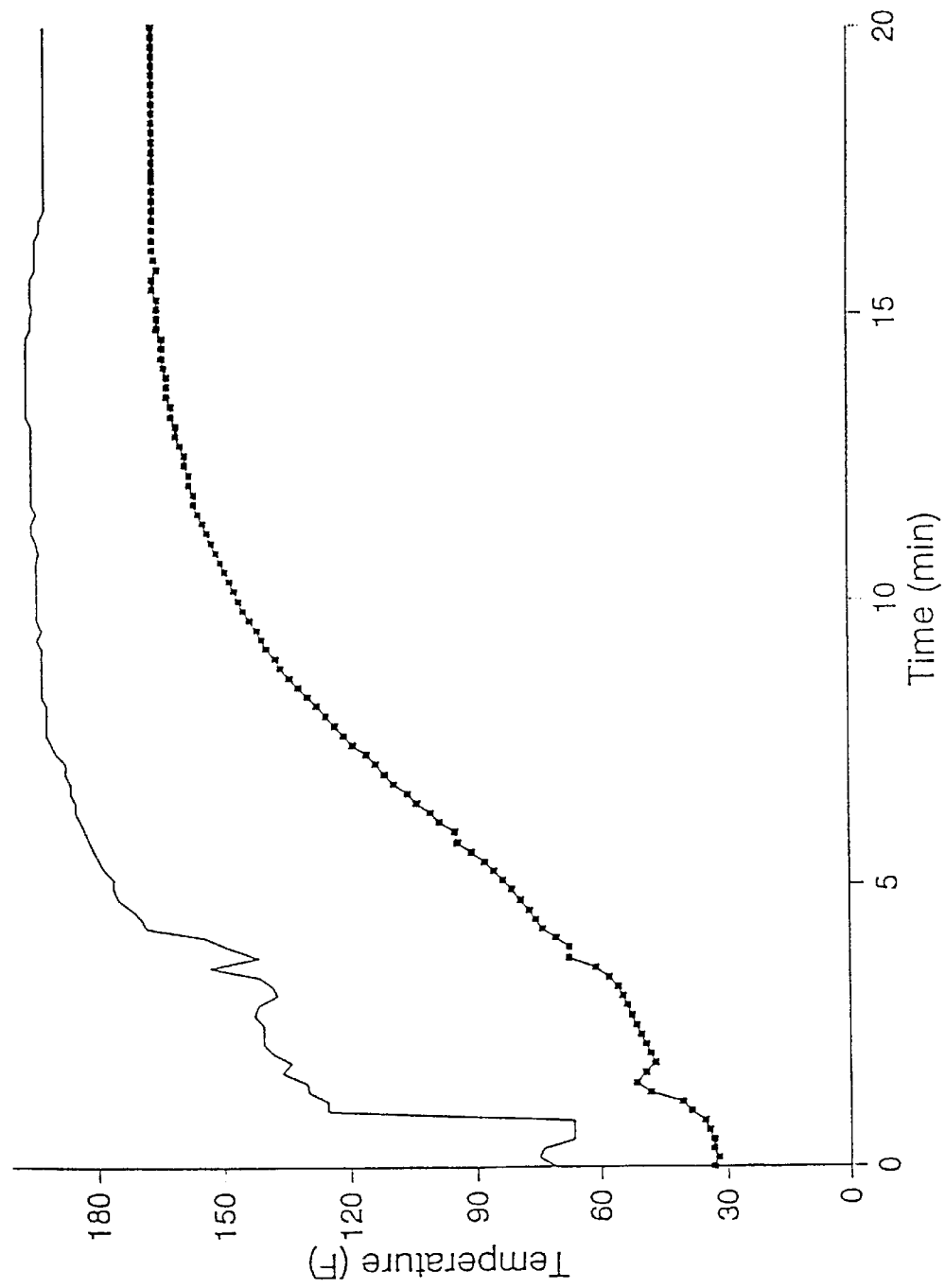
FIG. 9 is a graph of temperature as a function of time after heater pad activation, produced from a monolayer pad made of a 1:1 ratio by weight of $P_2O_5$ and CaO, tested with a vessel containing simulated food (8 ounces of water). The container is a plastic box. One trace is from a thermocouple in the heater, and the other trace is from a thermocouple in the simulated food vessel.

FIG. 9 is a graph showing the change in temperature of the food (-■-) (measured in the middle) and of the heater (-), as a function of time after heater activation. The heater pad used is a monolayer pad made of a 1:1 ratio by weight of $P_2O_5$ and CaO. The initial temperature of the food is just above freezing, that is about 32–33° F. The container is a plastic box. At about 15 minutes after heater activation, the temperature of the food (middle) is about 165 ° F.

Figure 10:
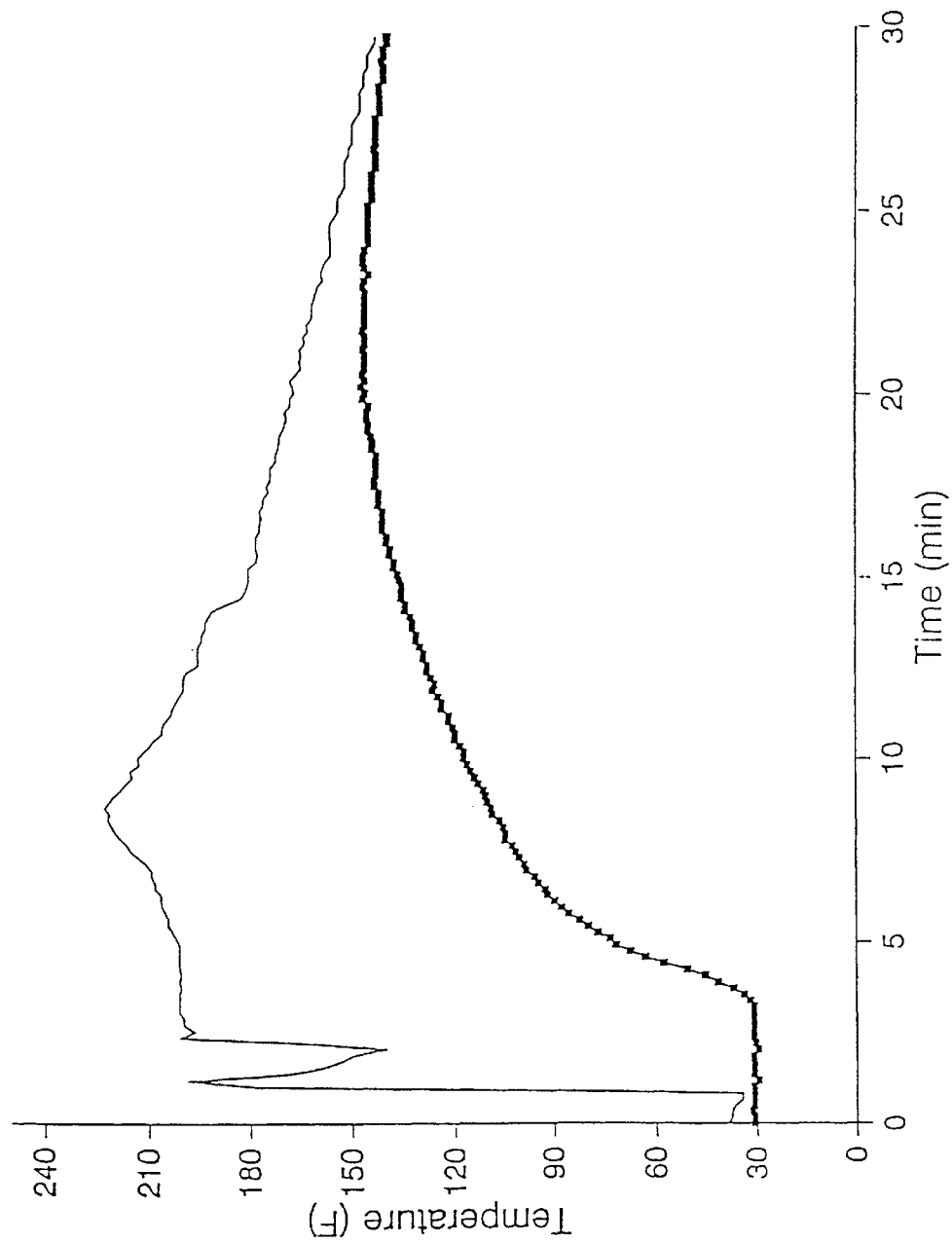
FIG. 10 is a graph of temperature as a function of time after heater pad activation, produced from a monolayer pad made of a 1:1 ratio by weight of $P_2O_5$ and CaO, tested with a vessel containing simulated food (8 ounces of water). The container is a plastic box. Shown is a temperature profile of heater and food where the initial temperature of the heater and food was 30° F. The food was initially frozen.

FIG. 10 is a graph showing the change in temperature of the food (-■-) (measured in the middle) and of the heater (-), as a function of time after heater activation. The heater is a single-layer pad made of a 1:1 ratio by weight of $P_2O_5$ and CaO. The initial temperature of the food is below freezing, that is about 30° F. Therefore, the food is frozen at the time the heater is activated. The container is a plastic box. At about 20 minutes after heater activation, the temperature of the food (middle) is about 150° F. This illustrates that the heater of the present invention can effectively heat food even if the food is initially frozen.

Figure 11:
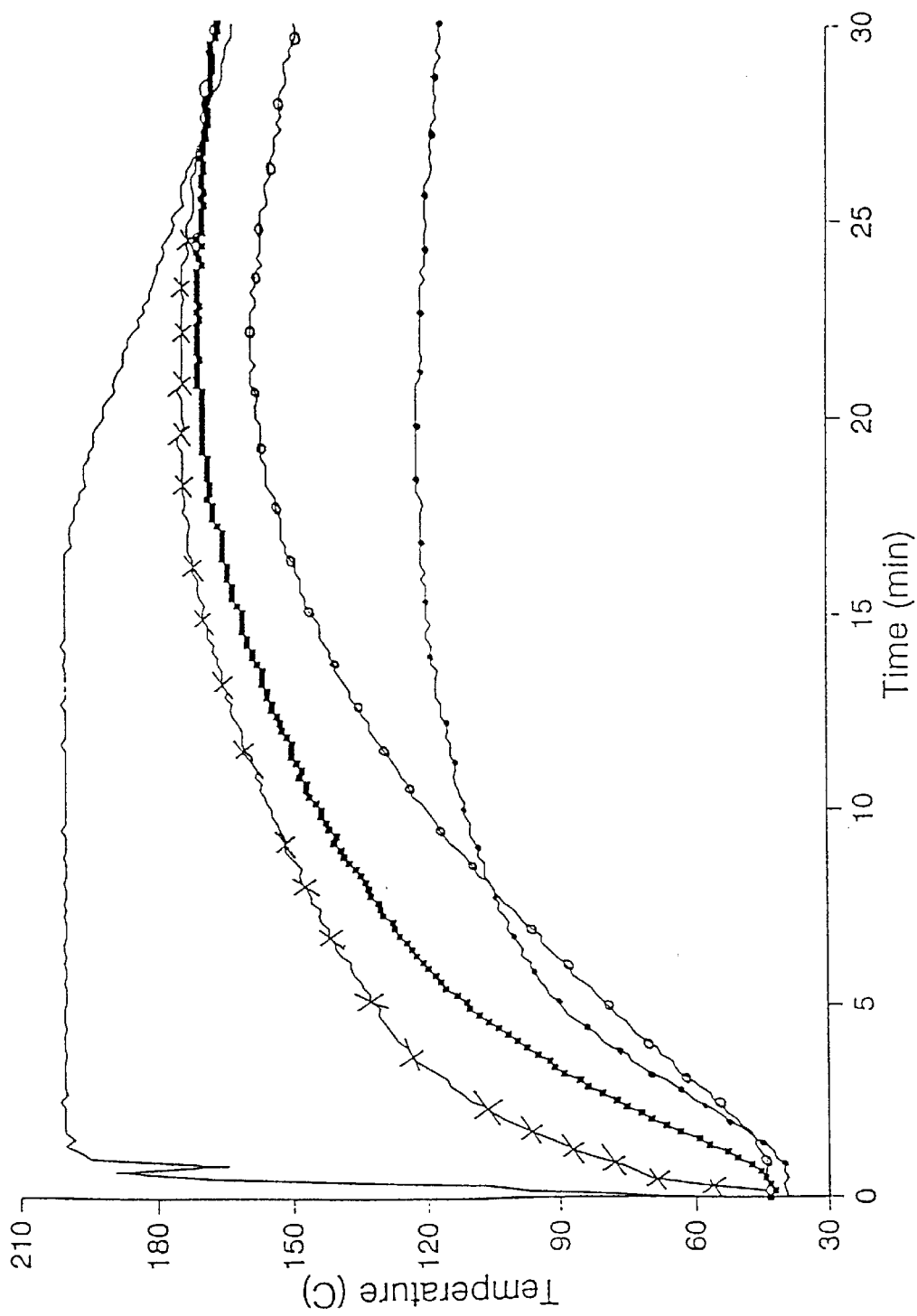
FIG. 11 is a graph of temperature as a function of time after heater pad activation, produced from a monolayer pad made of a 1:1 ratio by weight of $P_2O_5$ and CaO, tested with a vessel containing simulated food (hydrated clay, in a plastic tray). The heater is in a plastic tray. Shown is a temperature profile of heater and simulated food where the initial temperature of the heater and food was 40° F.

FIG. 11 is a graph of temperature as a function of time after heater pad activation. The heater pad was a single-layer pad made of a 1:1 ratio by weight of $P_2O_5$ and CaO. The food vessel was a plastic tray and contained simulated food, hydrated clay. Temperature profiles of the heater (-) and various parts of the "food" are shown. The temperatures of the various parts of the food are indicated as follows: Food bottom (-X-); food middle (-■-); food top (-○-); and food edge (-●-). The initial temperature of the heater and food was about 40° F. At about 20 minutes after activation, the temperature at the middle of the food was about 165° F.

Figure 12:
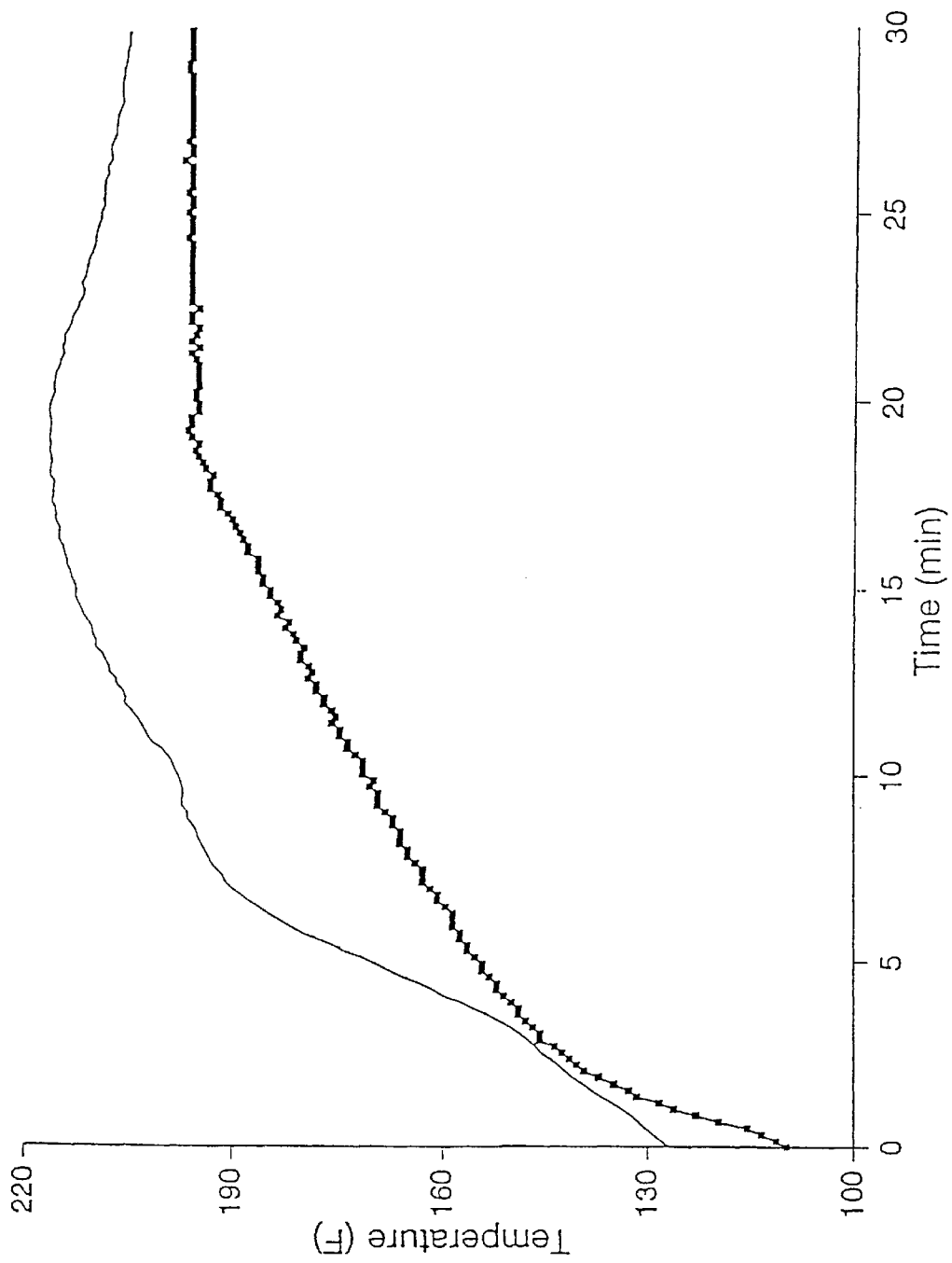
FIG. 12 is a graph of temperature as a function of time after heater pad activation, produced from a monolayer pad made of a 1:1 ratio by weight of $P_2O_5$ and CaO, tested with a vessel containing simulated food (hydrated clay, in a plastic tray). The heater is in a plastic tray. Shown is a temperature profile of heater and simulated food where the initial temperature of the heater and food was 110° F.

FIG. 12 is a graph of temperature as a function of time after heater pad activation. The heater pad was a single-layer pad made of a 1:1 ratio by weight of $P_2O_5$ and CaO. The food vessel was a plastic tray and contained simulated food, hydrated clay. Temperature profiles of the heater (-) and "food" (-■-) (measured in the middle) are shown. The initial temperature of the food was about 110° F., and this graph illustrates that the heater of this invention can substantially heat food or other materials even if their starting temperatures are very high. (The increase in temperature was about 85° F.)

The heaters and heat-producing composition can be used in other applications. For example, they can be used to initiate additional exothermic or endothermic reactions. For example, they can be used to ignite pyrotechnic devices (which rely on exothermic reactions). The heater of the present invention can also be used to induce a phase change, e.g., melting ice to liquid water (an endothermic reaction).

Additionally, the heater of this invention can provide the initial heat required (typically provided by heating in a microwave oven) in sustained-heating products, such as the MICROCORE™ comfort therapy products (HEARTWARMERS® relief wrap, or the portable Back Warmer); or MICROCORE™ kitchen products (mug which keeps beverages warm for hours, or the LAVA BASKET™ which keeps bread warm for hours.) The heat-producing composition of the present invention can also be mixed (as a powder) into a thermally cured bonding material. Similar application of the heater of this invention is to use it in combination with other phase change materials which produce heat after being brought to their transition temperatures. An application of this type is to place the heater of this invention into a container (a sack or pillow or any container with properties appropriate for the precise application) which also holds a phase change material, e.g., $Mg(NO_3)_2.6$ $H_2O$. $Mg(NO_3)_2.6$ $H_2O$ has a transition temperature of 89° C. The heater of the present invention can be activated by addition of aqueous solution and provide the heat needed to initiate the phase change of $Mg(NO_3)_2.6$ $H_2O$.

Other applications of the heater of this invention include using it as a source of heat to keep foods warm on picnics by placing the activated heater pad in a sealed sack next to the food to be kept warm. An activated heater pad sealed in a sack can also be placed inside gloves to provide hand-warmers. The heater pad of this invention could also be applied to a curing agent when heat is required for such agent to perform its function. For example, the heater pad could be applied to a thermally-cured adhesive or sealant, in order to cure it more rapidly or increase its performance.

The temperature attained by the heat-producing composition of this invention is based on the desired application and can be determined by routine choice of materials without undue experimentation.

The following examples are provided to illustrate the invention, but are not intended to limit the scope of the invention.

EXAMPLE

Example 1

Heater using $P_2O_5$/CaO, with Composition Extruded into Pellets.

The $P_2O_{5/CaO}$ (1:1 by weight) composition was extruded in the form of pellets. This heater (FIGS. 1A and 1B) produces heat at a desired rate over a selected time period. The heater is formed by mixing the solid powders ($P_2O_5$ and CaO), adding inert liquids to control the rate of heat production and facilitate processing, and extruding the composition using a ram extruder, screw extruder, pellet mill, or the like. The composition was prepared by mixing CaO and $P_2O_5$ in equal weight ratios, then adding 13.4% or 15.4% of a liquid consisting of 74% white mineral oil and 26% surfactant Actrafos 216. After extrusion through a ⅛-inch die on a pellet mill, and cutting the extrusions to a length of ⅛ to ½ inch, the pellets were heated to about 100° C. for 0.5 to 1.0 hour. Heating the pellets leads to improved performance of the pellets. It has been noticed that without heating the pellets, after a few weeks the originally white pellets start to become brown. We believe that heating the pellets leads to improved performance because whatever reaction is occurring, evidenced by the color change is made to occur immediately upon heating, thereby leading to a more stable product. After heating, the pellets were shaken over an ASTM 8 mesh screen to remove fine particles. The heater pellets were contained in a polymer scrim bag for convenience in handling.

FIG. 5 shows heating curves (temperature of the food vessel versus time in minutes) for a vessel containing 8 oz. of water (simulating food), heated by 60 g of an extruded composition in a heating device like the one shown in FIG. 4A. In batch #1, the amount of inert material added is 15.4% of the weight of the CaO and $P_2O_5$ together. In batch #2, the amount of inert material added is 13.4% of the weight of the CaO and $P_2O_5$ together.

Example 2

Heater using $P_2O_5$/CaO in a Single-layer Heater

Two or more $P_2O_5$/CaO compositions producing heat at different rates (based on relative concentrations of reactants $P_2O_5$ and CaO versus inert materials) were prepared separately and then combined together as powders or aggregates into a single-layered pad to give the desired heat transfer rate over a selected period of time to heat an 8-ounce food bag. The monolayer pad (FIGS. 2A and 2B) was sealed in a polymer-blend scrim to prevent the material from contacting the food bag surface. The monolayer pad was prepared by mixing the ingredients and pressing at about 10,000 psi between two layers of porous scrim. The composition contained 15% inert materials, consisting of the surfactant Brij 30, mineral oil, and paraffin wax, in a proportion by weight of 20%, 30%, and 50%, respectively. The monolayer pad was activated inside a high-density polyethylene plastic sack. The heater was placed beneath the food vessel inside a plastic sack and activated by addition of about 45 ml of water. The sack with the heater, food vessel, and activating solution was placed inside a container (a cardboard box in this case) during the reaction period. After about fifteen minutes the 8-ounce food vessel can be removed for consumption. The monolayer pad is capable of heating the meal by more than 100° F. within 12 minutes.

Example 3

Heater using $P_2O_5$/CaO in a Two-layer Pad

One variation of the $P_2O_5$/CaO embodiment is a two-layer pad consisting of a slow-acting layer on top of a fast-acting layer. Both layers contain CaO and $P_2O_5$ in a 1:1 weight ratio, but the layers differ in reaction rates due to the amount of additives present in each. The top, slow-acting layer has a lower concentration of the $P_2O_5$/CaO composition and a higher concentration of inert materials which act to slow the heat producing reaction. The bottom, fast-acting layer has a higher concentration of the $P_2O_5$/CaO composition and a lower concentration of inert materials which act to slow the heat producing reaction. The two layers are formulated to react at different rates to effect a quick temperature rise (by the bottom, fast-acting layer) that is sustainable over a selected time period (by the top, slow-acting layer) at a desired rate.

The rate of heat production in each layer is controlled by the addition of a surfactant, and by the addition of oil and/or wax. The composition of the two layers is shown in Table 6 below. The heater is formed by mixing the reactants ($P_2O_5$ and CaO) and inert materials. A layer of porous scrim, which can be made of plastic, tea-bag material, cotton, polymers like nylon or any other suitable material, is placed into a mold of the desired shape. Next, the fast-acting composition, then a second layer of scrim to separate the two compositions, then the slow-acting composition, and last a top layer of scrim, are added to the mold. The heater is then pressed at a pressure of about 10,000 psi. The pad compositions perform well, but do have a tendency to crumble in use, and the powdered materials tend to react too rapidly. See FIG. 3.

Table 6 shows the reactants and inert materials, and amounts thereof, of a heater made in this embodiment.

TABLE 6

Components of an Embodiment Using $P_2O_5$/CaO in a Two-Layer Heater

| Components | Slow Composition, Top Layer | Fast Composition, Bottom Layer |
|---|---|---|
| $P_2O_5$/CaO | 43.8 g | 35.83 g |
| Brij 30 (surfactant) | 3.14 g | 0.7 g |

TABLE 6-continued

Components of an Embodiment Using $P_2O_5$/CaO in a Two-Layer Heater

| Components | Slow Composition, Top Layer | Fast Composition, Bottom Layer |
|---|---|---|
| Mineral Oil | 2.2 g | 3.41 g |
| Paraffin Wax | 0.94 g | Polyethylene Beads 1.03 g |

The bottom layer of the pad contains 40.97 g of heat-producing composition which reacts rapidly. The top layer contains 50.08 g of heat-producing composition which reacts more slowly to sustain the elevated temperature needed to thoroughly heat a standard food ration. The heater was activated by about 40 ml of water, providing heat for either an 8- or a 10-ounce meal, elevating the temperature by more than 100° F. within 12–15 minutes.

In this example, the two-layer heater is cut into three strips with dimensions of 0.94 inches by 5 inches. This arrangement is used to heat food in a container which is a thermoformed plastic tray 4.5×6 inches, and 0.75 inch deep. By creating channels of about ⅛ to about ¼ of an inch across in the pad, more of the reactive material is available for contact with the activating solution. In this example, the heater is placed below the food compartment and is activated in the container with about 60 ml of water. This three-strip, two-layer configuration heated a 10-ounce "meal" by more than 100° F. within the first 12 minutes after activation. After activation of the heater with water, the final material had a pH of about 6 to 7.

Example 4

Multi-Compartment Heater with Pads and Channels

A heater consisting of a single solid piece of heat-producing composition may not produce all of the available heat because water does not reach all parts of the pad, leaving some parts of the heater unreacted. This is a problem particularly when a heater is in direct contact with a food tray where water can enter the heater only through its edges. This problem is solved by mounting many the pads on a backing with channels between the pads. Each pad is firmly mounted so that it will not shift during shipping or handling. The heater can be produced as a sheet of pads with the entire sheet encased within polyethylene scrim. The pads can be integrally mounted on a scrim sheet during pressing. This type of design is quite flexible and can easily be adapted to various heater device configurations.

The width of the channels and the size of the pads affects efficiency of heat production. Wider channels are generally preferred to increase water access to the heat-producing composition. However, the amount of heat production required for a given heater application and size constraints on the heater device may limit the width of such channels.

This multi-compartment heater can employ multi-layer pads. For example, pads can be constructed of two layers: a (bottom) fast layer and a (slow) top layer. (FIG. 3A) An exemplary pad can contain a fast layer and a slow layer. The exemplary fast layer (45% of a pad by weight) contains CaO (43.75%); $P_2O_5$ (43.75%); Brij 30 surfactant (1.67%); mineral oil (8.33%); polymethylmethacrylate beads (200μ) (2.50%) The exemplary slow layer (55% of a pad by weight) contains CaO (43.75%); $P_2O_5$ (43.75%); Brij 30 surfactant (6.25%); mineral oil (4.37%); paraffin wax (1.88%).

Example 5

Heater Compositions with Magnesium Chloride and Calcium Oxide

Pellets of mixtures of anhydrous $MgCl_2$ and CaO were prepared by mixing the solids and an inert liquid binder in a bowl-type electric mixer with a whip attachment; no precautions were taken to prevent absorption of water from the atmosphere. The inert binder material was 26% by weight of one of the surfactants Brij 30 (Polyoxyethyene 4 Lauryl Ether) or Actrafos 216 (an organic phosphate ester), with the balance of the inert binder being mineral oil. The amount of inert binder combined with the active ingredients CaO and $MgCl_2$ as a percent of the total weight of the heat-producing composition is shown in Table 7 which summaries the results of tests of heat-producing compositions using magnesium chloride and mixtures of magnesium chloride and calcium oxide. In all cases the balance of the weight of heat-producing solids was made up of calcium oxide. Water as indicated was used to activate the heat-producing composition.

TABLE 7

| Test # | % $MgCl_2$ | % Binder with Brij 30[#] | % Binder with Actrafos 216[#] | Pressure (psi) | Water (cc) | Heat time (sec) | Max. temp deg F. |
|---|---|---|---|---|---|---|---|
| 1 | 100 | 10 | | 10,000 | 10 | 60 | 260 |
| 2 | 100 | | | 20,000 | 15 | 60 | 250 |
| 3 | 50 | | 15 | 500 | 10 | 168 | 250 |
| 4 | 50 | 15 | | 10,000 | 7 | 300 | 175 |
| 5 | 75 | 15 | | 10,000 | 7 | 300 | 220 |
| 6 | 50 | | 15 | 20,000 | 7 | 200 | 150 |
| 7 | 75 | | 15 | 20,000 | 7 | 150 | 190 |
| 8 | 100 | 5 | | 20,000 | 7 | 150 | 250 |
| 9 | 100 | 10 | | 20,000 | 7 | 100 | 230 |
| 10 | 25 | | 10 | 5,000 | 10 | 240 | 204 |
| 11 | 25 | | 10 | 20,000 | 10 | 270 | 204 |
| 12 | 35 | | 5 | 20,000 | 10 | 255 | 204 |
| 13 | 35 | | 10 | 20,000 | 10 | 450 | 204 |
| 14 | 35 | | 15 | 20,000 | 10 | 500 | 135 |
| 15 | 35 | | 15 | 20,000 | 5 | 300 | 125 |
| 16 | 50 | 15 | | 20,000 | 10 | 400 | 203 |
| 17 | 50 | | 10 | 20,000 | 8 | 420 | 225 |
| 18 | 35 | | 10 | 20,000 | 10 | 450 | 204 |

[#]Weight % total inert binder which was 26% by weight of the surfactant indicated, with the balance of the inert binder being mineral oil.

In tests 1 through 6 inert liquid binder was added to the bowl and then solid(s) were added with mixing. In tests 7 through 18, the dry solid(s) were mixed together and the inert liquid binder was added to the mixture with stirring. Various percentages of $MgCl_2$ and CaO were combined with the inert binder and then pelletized in a 100 pellet die using a small hydraulic press into 0.125" diameter by 0.125" long pellets. The pressure of the hydraulic fluid in the press used to form pellets is also indicated in Table 7; the piston diameter was 1.875 for all tests. The heater pellets were placed into a calorimeter and hydrated to activate. The calorimeter included a cup in which water could be mixed with the heat-producing composition; above the cup was a copper block configured so that steam produced by the heat-producing composition passed through passages in the block. The temperature of the block, as well as the temperature of the heat-producing composition, was monitored by thermocouples. Temperature data were digitized and recorded on a computer.

Figure 13:
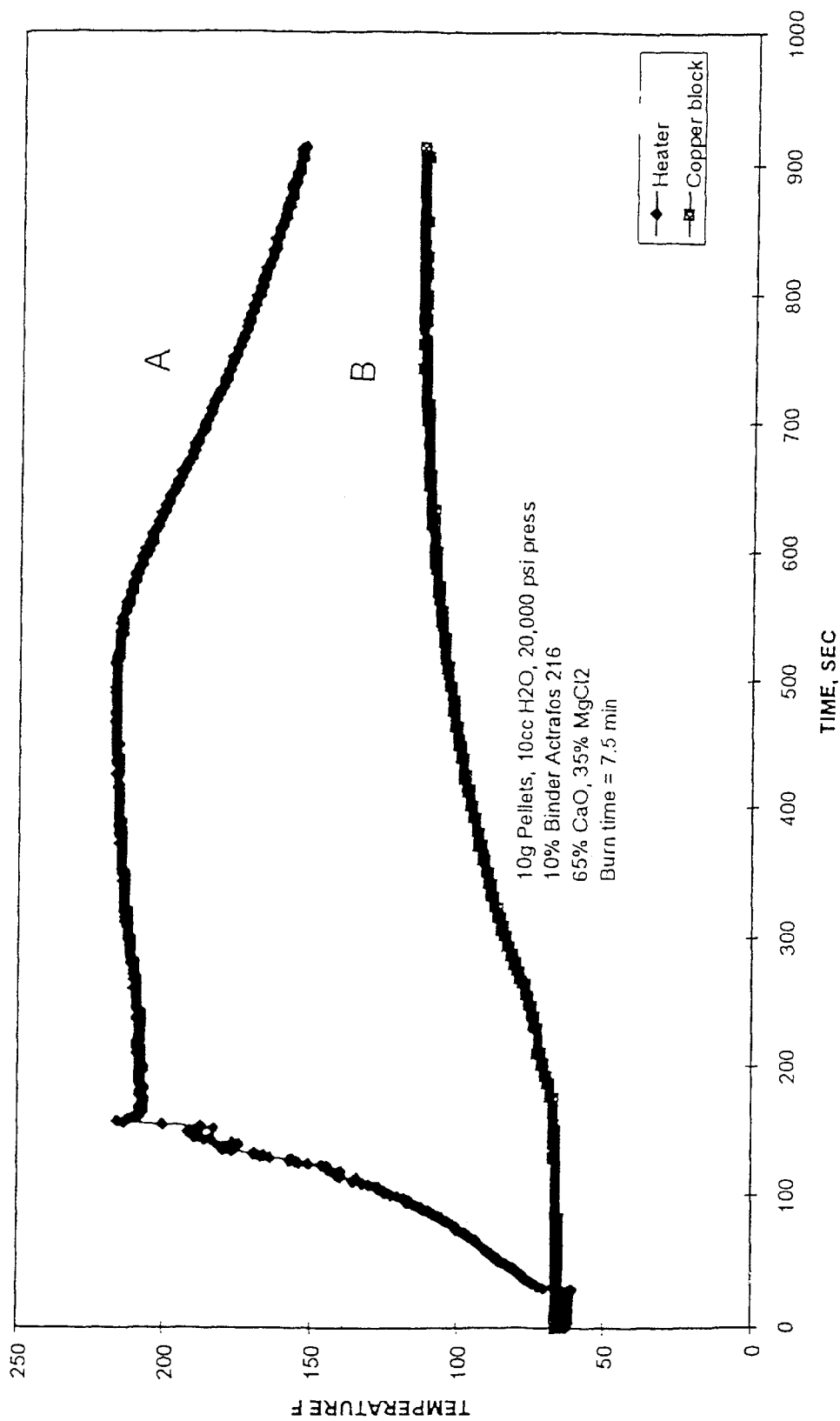
FIG. 13 is a graph of temperature as a function of time after activation of a heat-producing composition that contained 90% by weight of a mixture of CaO (65% by weight) and $MgCl_2$ (35% by weight) with 10% by weight of a mixture of inert materials (26% by weight of surfactant Acrtrafos 216 and the balance mineral oil). Temperature was measured in contact with the activated heat-producing composition (A) and at a copper block positioned above the activated heat-producing composition (B).

The length of heating (after achieving maximum temperature) and temperature (° F.) of the material is dependent on the formulation using the components mentioned above. $MgCl_2$ agglomerated with inert binder without CaO tends to give a rapid reaction and incomplete hydration (tests 1 and 2, Table 7) both of which are undesirable. The time-temperature profile of a more useful heat-producing composition comprising a mixture of CaO and $MgCl_2$ is shown in FIG. 13 which produced heat for 7.5 minutes after maximum temperature was achieved. This amount of time is sufficient for heat transfer from the heater to the component to be heated, in a wide variety of configurations and applications.

Those of ordinary skill in the art will recognize that compositions, articles, methods and devices other than those specifically disclosed herein may be employed in this invention. All such variants are encompassed within the spirit and scope of this invention. All references cited herein are incorporated in their entirety by reference herein to the extent not inconsistent herewith.

We claim:

1. A method for regulating the rate at which heat is generated on activation of a heat-producing composition comprising mixtures selected from the group consisting of a mixture of an acidic anhydride with a basic anhydride, a mixture of an acidic anhydride with a basic salt, a mixture of an acidic salt with a basic anhydride, a mixture of an acidic salt with a basic salt, and combinations of these mixtures, which method comprises the step of adding to the heat-producing composition, prior to activation, an amount of an inert material effective for retarding activation and regulating the rate at which heat is generated by the heat-producing composition wherein the inert material is selected from the group consisting of an oil, a wax, a surfactant, and mixtures thereof.

2. The method of claim 1 wherein the heat-producing composition is activated by contact with water or an aqueous solution.

3. The method of claim 1 wherein the heat-producing composition comprises a heat-producing compound that is selected from the group consisting of an acidic anhydride, an acidic salt, or both in combination with a basic anhydride.

4. The method of claim 3 wherein the heat-producing composition comprises calcium oxide.

5. The method of claim 1 wherein the heat-producing composition comprises a basic anhydride, a basic salt, or both in combination with an acidic anh dride.

6. The method of claim 1 wherein the heat-producing composition comprises calcium oxide and phosphorous pentoxide.

7. The method of claim 1 wherein the heat-producing composition comprises calcium oxide and magnesium chloride.

8. The method of claim 1 wherein the amount of inert material added to the heat-producing composition ranges from about 1% to about 30% by weight of the heat-producing composition.

9. The method of claim 1 wherein the inert material comprises an oil and a surfactant.

10. The method of claim 1 wherein the surfactant is selected from the group consisting of organic phosphate esters, polyethoxylated alcohols, polyamine succinimides and mixtures thereof.

11. The method of claim 1 further comprising the step of forming the heat-producing composition containing the inert material into aggregates, granules, pellets or pads, prior to activation.

12. The method of claim 1 wherein, after activation of the heat-producing composition containing inert material, heat is generated up to about 30 minutes.

13. The method of claim 1 wherein the heat-producing composition comprises an acidic salt and a basic anhydride or comprises an acidic salt and a basic salt.

14. The method of claim 1 wherein the surfactant is an organic phosphate ester or a mixture of organic phosphate esters.

15. The method of claim 1 wherein the inert material is added to the heat-producing composition as a coating.

16. The method of claim 1 wherein the heat-producing composition is formed into aggregates, granules, pellets or pads and the inert material is added as a coating of the heat-producing composition.

17. The method of claim 7 wherein said inert material consists essentially of a surfactant in combination with an oil.

18. A method for heating food or other comestible which comprises the steps of:
   (a) placing the food or other comestible in proximity to a water-free heat-producing composition which comprises:
      (i) one or more heat-producing compounds selected from the group consisting of an acid anhydride, an acidic salt, a basic anhydride, a basic salt, and mixtures thereof; and
      (ii) an inert material selected from the group consisting of a surfactant, an oil, a wax and mixtures thereof, wherein the inert material is present in an amount effective for regulating the rate at which heat is generated by the heat-producing compound(s) in the heat-producing composition; and
   (b) activating the heat-producing composition containing the inert material by contacting it with an activating solution to generate heat to thereby heat the food or other comestible.

19. The method of claim 18 wherein the heat-producing compounds comprise an acidic anhydride and a basic anhydride or comprise an acidic anhydride and a basic salt.

20. The method of claim 18 wherein the heat-producing compounds comprise calcium oxide and phosphorous pentoxide.

21. The method of claim 18 wherein the heat-producing compounds comprise calcium oxide and magnesium chloride.

22. The method of claim 18 wherein the inert material comprises surfactant and oil.

23. The method of claim 20 wherein the inert material is present in the heat-producing composition in an amount ranging from about 1% to about 30% by weight of the heat-producing composition.

24. The method of claim 18 wherein the temperature of the food or other comestible is raised by about 75° to 130° F. in 12 minute.

25. The method of claim 18 wherein the heat-producing composition is in the form of granules, pellets, or pads.

26. The method of claim 18 wherein the heat-producing composition is in the form of multiple layers of pads.

27. The method of claim 26 wherein pads of different layers are formed from heat-producing compositions having different amounts of inert material.

28. The method of claim 18 wherein the heat-producing compounds are an acidic salt and a basic anhydride or the heat-producing compounds are an acidic salt and a basic salt.

29. The method of claim 18 wherein the surfactant is selected from the group consisting of organic phosphate esters, polyethoxylated alcohols, polyamine succinimides and mixtures thereof.

30. The method of claim 18 wherein the inert material is a surfactant which is an organic phosphate ester or a mixture of organic phosphate esters.

31. A water-free heat-producing composition comprising an acidic salt, a basic anhydride and an inert material selected from the group consisting of a surfactant, an oil, a wax and mixtures thereof wherein the inert material is present in the composition in an amount effective for regulating the rate at which heat is generated by the heat-producing composition on activation.

32. The heat-producing composition according to claim 31 wherein the basic anhydride is CaO and the acidic salt is anhydrous magnesium chloride.

33. The heat-producing composition of claim 31 wherein the inert material comprises surfactant and oil.

34. The heat-producing composition of claim 31 wherein the surfactant is selected from the group consisting of organic phosphate esters, polyethoxylated alcohols, polyamine succinimides and mixtures thereof.

35. The heat-producing composition of claim 33 wherein the surfactant is an organic phosphate ester or a mixture of organic phosphate esters.

36. The heat-producing composition of claim 31 which is in the form of granules, pellets, or pads.

37. The heat-producing composition of claim 31 which is in the form of multiple layers of pads.

38. The heat-producing composition of claim 37 wherein pads of different layers are formed from heat-producing compositions containing different amounts of inert material.

39. A heater comprising the heat-producing composition of claim 31.

40. A heater of claim 39 also comprising means for contacting the heat-producing composition with a sufficient amount of activating solution to ensure substantially complete reaction of the heat-producing composition in a single operation.

41. A method for making a water-free heat-producing composition, from which heat is generated by contact with an activating solution, which method comprises the step of combining a heat-producing compound selected from the group consisting of an acidic anhydride, an acidic salt, a basic anhydride, a basic salt and mixtures thereof with an inert material selected from the group consisting of a surfactant, an oil, a wax, natural or synthetic polymers and mixtures thereof, wherein the inert material is present in the composition in an amount effective for regulating the rate at which heat is generated by the heat-producing composition on activation with an activating solution.

42. The method of claim 41 wherein the inert material is selected from the group consisting of a surfactant, an oil, a wax, and mixtures thereof.

43. The method of claim 41 further comprising the step of forming the combination of the heat-producing compound and the inert material into aggregates, granules, pellets or pads.

44. The method of claim 41 further comprising the step of pressing the combination of the heat-producing compound and the inert material into a pad.

45. The method of claim 43 wherein the heat-producing composition is in the form of multiple layers of pads wherein each pad contains different amounts of inert material.

46. The method of claim 41 wherein the inert material is coated on the heat-producing compound.

47. The method of claim 41 wherein the heat-producing compound is formed into aggregates, granules, pellets or pads and the inert material is coated on the aggregates, granules, pellets or pads.

48. A method for heating an item to be heated which comprises the steps of:
   (a) placing the item in proximity to a water-free heat-producing composition which comprises:

(i) one or more heat-producing compounds selected from the group consisting of an acid anhydride, an acidic salt, a basic anhydride, a basic salt, and mixtures thereof; and (ii) an inert material selected from the group consisting of a surfactant, an oil, a wax, natural or synthetic polymers and mixtures thereof, wherein the inert material is present in an amount effective for regulating the rate at which heat is generated by the heat-producing compound(s) in the heat-producing composition; and (b) activating the heat-producing composition containing the inert material by contacting it with an activating solution to generate heat to thereby heat the item.

49. The method of claim 48 wherein the inert material is selected from the group consisting of a surfactant, an oil, a wax and mixtures thereof.

50. The method of claim 48 wherein the heat-producing composition comprises a heat-producing compound coated with the inert material.

51. The method of claim 48 wherein the item to be heated is a liquid or a solid.

52. The method of claim 48 wherein the item to be heated is an article of clothing.

53. The method of claim 48 wherein the item to be heated is a curing agent, a thermally-curable adhesive or a thermally-curable sealant.

54. A method for regulating the rate at which heat is generated on activation of a heat-producing composition comprising mixtures selected from the group consisting of a mixture of an acidic anhydride with a basic anhydride, a mixture of an acidic anhydride with a basic salt, a mixture of an acidic salt with a basic anhydride, a mixture of an acidic salt with a basic salt, and combinations of these mixtures, which method comprises the step of adding to the heat-producing composition, prior to activation, an amount of an inert material effective for retarding activation and regulating the rate at which heat is generated by the heat-producing composition wherein the inert material is selected from the group consisting of an oil, a wax, a surfactant, a natural or synthetic polymer, and mixtures thereof.

* * * * *

UNITED STATES PATENT AND TRADEMARK OFFICE
CERTIFICATE OF CORRECTION

PATENT NO. : 6,248,257 B1
DATED : June 19, 2001
INVENTOR(S) : Bell et al.

It is certified that error appears in the above-identified patent and that said Letters Patent is hereby corrected as shown below:

Title page,
Item [57], ABSTRACT
Line 20, please replace "produced" with -- produce --.

Column 5,
Line 9, please insert -- a -- between "combining" and "heat-producing".

Column 11,
Line 3, please insert -- a -- between "to" and "at".
Line 9, please delete "w".

Column 15,
Line 41, please replace "$P_2O^{5(aq)}$" with -- $P_2O_{5(aq)}$ --.

Column 18,
Line 1, please replace "or" with -- of --.

Column 19,
Line 3, please delete "a".

Column 24,
Line 29, please replace "$P_2O_{5/CaO}$ (1:1" with -- $P_2O_5$/CaO (1:1 --.

Column 26,
Line 44, please insert -- of -- between "many" and "the".

Column 28,
Line 44, please replace "anh dride" with -- anhydride --.

UNITED STATES PATENT AND TRADEMARK OFFICE
CERTIFICATE OF CORRECTION

PATENT NO.     : 6,248,257 B1
DATED          : June 19, 2001
INVENTOR(S)    : Bell et al.

It is certified that error appears in the above-identified patent and that said Letters Patent is hereby corrected as shown below:

<u>Column 29,</u>
Line 44, please replace "20" with -- 18 --.
Line 50, please replace "minute." with -- minutes. --.

Signed and Sealed this

Sixteenth Day of July, 2002

*Attest:*

JAMES E. ROGAN
*Director of the United States Patent and Trademark Office*

*Attesting Officer*